United States Patent [19]

Asano

[11] Patent Number: 6,032,185

[45] Date of Patent: Feb. 29, 2000

[54] BUS NETWORK WITH A CONTROL STATION UTILIZING TOKENS TO CONTROL THE TRANSMISSION OF INFORMATION BETWEEN NETWORK STATIONS

[75] Inventor: Hiroaki Asano, Katano, Japan

[73] Assignee: Matsushita Electric Industrial Co., Ltd., Osaka-fu, Japan

[21] Appl. No.: 08/753,610

[22] Filed: Nov. 27, 1996

[30] Foreign Application Priority Data

Nov. 28, 1995 [JP] Japan ................................. 7-309508

[51] Int. Cl.$^7$ .................................................. G06F 13/00
[52] U.S. Cl. ........................... 709/227; 709/235; 709/228
[58] Field of Search .................................. 370/438, 453, 370/909, 450, 451, 452, 454, 433, 443, 444; 359/136; 395/200.6, 200.57, 200.81; 340/825.08

[56] References Cited

U.S. PATENT DOCUMENTS

| | | | |
|---|---|---|---|
| 4,313,196 | 1/1982 | Oblonsky | 370/439 |
| 4,604,742 | 8/1986 | Hamada et al. | 370/454 |
| 4,682,168 | 7/1987 | Chang et al. | 340/825.65 |
| 4,685,105 | 8/1987 | Shikama et al. | 370/454 |
| 4,809,361 | 2/1989 | Okada et al. | |
| 4,972,507 | 11/1990 | Lusignan | 455/503 |
| 5,150,114 | 9/1992 | Johansson | 340/825.54 |
| 5,276,900 | 1/1994 | Schwede | 395/200.38 |
| 5,319,485 | 6/1994 | Yasui et al. | 359/128 |
| 5,337,312 | 8/1994 | Heinzmann et al. | 370/440 |
| 5,369,516 | 11/1994 | Uchida | 359/125 |
| 5,418,785 | 5/1995 | Olshansky et al. | 370/438 |
| 5,434,861 | 7/1995 | Pritty et al. | 370/449 |
| 5,440,560 | 8/1995 | Rypinksi | 370/457 |
| 5,751,714 | 5/1998 | Albano et al. | 370/452 |
| 5,802,060 | 9/1998 | Fischbach et al. | 370/444 |
| 5,854,699 | 12/1998 | Olshansky | 359/125 |

OTHER PUBLICATIONS

F.E. Ross, "An Overview of FDDI: The Fiber Distributed Data Interface", IEEE Journal on Selected Areas in Communications, vol. 7, No. 7, pp. 1043–1051, Sep. 1989.

M.S. Goodman et al., "The LAMBDANET Multiwavelength Network: Architecture, Applications and Demonstrations", IEEE Journal on Selected Areas in Communications, vol. 8, No. 6, pp. 995–1003, 1990.

F.J. Janneillo, Rajiv Ramaswami and David G. Steinberg, "A Prototype Circuit–Switched Multi–Wavelength Optical Metropolitan–Area Network", International Communication Conference, pp. 818–823, 1992.

I. Chlamtac et al., "A Multibus Train Communication (AMTRAC) Architecture for High–Speed Fiber Optic Networkds" IEEE Journal on Selected Areas in Communications, vol. 6, No. 6, pp. 903–912, Jul. 1988.

Stallings, "Data and Computer Communications," Fourth Edition, Macmillan Publishing Company, 1994.

*Primary Examiner*—Frank J. Asta
*Assistant Examiner*—Thong Vu
*Attorney, Agent, or Firm*—Wenderoth, Lind & Ponack, L.L.P.

[57] ABSTRACT

A station judges, when a request to transmit information to the other stations is generated, that the station subsequent thereto does not send out a transmission request packet at the time point where a gap of time δ (i.e., a non-signal period of time δ) is confirmed from the receiving of a token immediately after the generation, to send out the transmission request packet onto a control channel of an outbound bus transmission line. The station sends out an information packet onto a data channel of the outbound bus transmission line when time Tf, i.e., time required to prepare receiving in the other station (time required to tune the wavelength of a variable wavelength filter) has elapsed since a token was received immediately after sending out the transmission request packet. The other station recognizes by a token that it has a transmission request to itself, and prepares the receiving of the information packet in response to the subsequent token, and receives the information packet from the data channel at the same time when the preparation of the receiving is terminated.

18 Claims, 15 Drawing Sheets

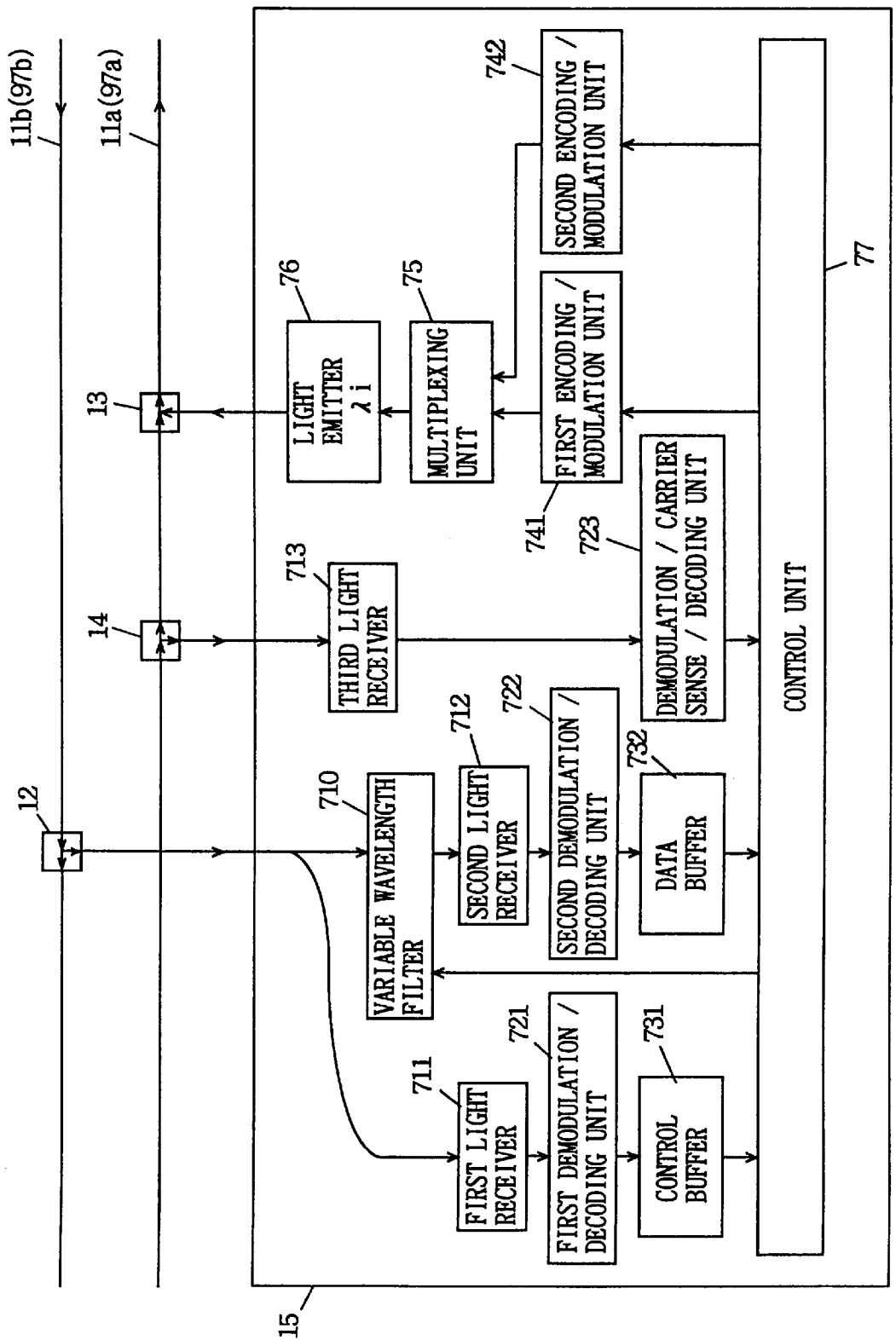

BUS NETWORK WITH A CONTROL STATION UTILIZING TOKENS TO CONTROL THE TRANSMISSION OF INFORMATION BETWEEN NETWORK STATIONS

BACKGROUND OF THE INVENTION

1. Field of the Invention

The present invention relates to a bus network, and more particularly, to a bus network to which stations can be accessed at high speed and efficiently when one of the stations transmits information to the other stations.

2. Description of the Background Art

It is expected that a network utilizing an optical fiber for a transmission line will be widely employed in the future because of the advantages that it can transmit a large amount of information utilizing the wide band characteristics of the optical fiber, and the optical fiber is not easily affected by noise.

In a transmission system utilizing the optical fiber, a system in which an exchange and a repeater positioned in the above-mentioned network convert a light signal, sent from a transmission terminal, into an electrical signal, then reconvert the electrical signal into the light signal, and send the light signal to a receiving terminal for receiving information, has been widely utilized. An example follows.

"First Background Art"

FIG. 13 is a block diagram showing the construction of a network described in the first document "F. E. Ross, "An Overview of FDDI: the Fiber Distributed Data Interface," IEEE Journal on Selected Areas in Communications Vol. 7 No. 7 pp.1043–1051, September 1989". In FIG. 13, each of the terminals comprises an optical/electrical converting device (illustrated as O/E) and an electrical/optical converting device (illustrated as E/O) in its inside, and constitute a ring network using an optical fiber. Each of the terminals converts a light signal sent from a previous terminal into an electrical signal, then converts the electrical signal into the light signal, and sends the light signal to a subsequent terminal.

In the transmission system, it has been pointed out that conversion from the light signal to the electrical signal (or conversion from the electrical signal to the light signal) is frequently performed within the network, whereby it is difficult to increase the number of terminals connected to the network and to increase the transmission speed of information.

In recent years, an optical network capable of sending a light signal from a transmission terminal to a receiving terminal without converting the light signal into an electrical signal has been examined. Further, a star network has the advantage that the transmission loss is smaller, as compared with a bus network. Therefore, many star networks have been conventionally studied and developed. A description of examples of the star optical network follows.

"Second Background Art"

FIG. 14 is a block diagram showing the construction of an optical network proposed in the second document "M. S. Goodman, et al. "The LAMBDANET multiwavelength network: Architecture, applications and demonstrations," IEEE Journal on Selected Areas in Communications Vol. 8 No. 6 pp.995–1003, 1990".

In FIG. 14, each of terminals comprises one transmitter having a fixed wavelength and receivers having a fixed wavelength, the number of which corresponds to the number of the terminals, and the terminals are connected to each other through a star coupler and an optical fiber, thereby constituting a star optical network. The wavelengths of the transmitters at the respective terminals are independent of each other. Further, in the optical network, the synchronization of the terminals is established, whereby communication is established using TDM time slots. On the transmission side, a destination terminal to which information can be transmitted is periodically assigned for each TDM time slot. Further, the assignment of TDM time slots is determined on the transmission side in order that information are not simultaneously received from a plurality of terminals on the receiving side.

In the optical network, the terminals must be synchronized with each other, including delay time in order that transmission information from the plurality of terminals do not collide with each other on a transmission line on the receiving side. In order to establish the synchronization, however, a mechanism for preparing a new channel or the like and transmitting a reference clock signal, for example, is required, whereby the construction of the optical network itself becomes complicated. Further, filters and receivers are required for each wavelength, that is, for each terminal, whereby the scale of the terminals is also increased.

Furthermore, in the optical communication system, communication is established by the assignment of the TDM time slots. That is, a band is assigned to each of the terminals irrespective of the presence or absence of information to be sent, whereby the transmission efficiency of transmission data is reduced.

"Third Background Art"

FIG. 15 is a block diagram showing the construction of an optical network proposed in the third document "F. J. Janneillo, R. Ramaswami, and D. G. Steinberg, "A prototype Circuit-Switched Multiwavelength Optical Metropolitan Area Network", International Communication Conference pp818–823, 1992".

In FIG. 15, each of stations comprises one light transmitter having a fixed wavelength and one receiver comprising a variable wavelength filter, and the stations are connected to a star coupler through a fiber, thereby constituting a star optical network. Wavelengths assigned to the light transmitters in the stations are independent for each terminal.

In the optical network shown in FIG. 15, the station on the information transmission side continues to send out a transmission request signal when a transmission request is generated. The receiver in each of the stations periodically scans the wavelength passband of the variable wavelength filter, to examine whether or not a transmission request addressed to itself is sent out into the network. Each of the stations fixes the wavelength passband of the variable wavelength filter when the receiver receives a transmission request signal addressed to itself, to receive information subsequently sent from the station on the information transmission side.

In the construction of the optical network, the station having a transmission request continuously sends out a transmission request signal utilizing the light transmitter. The station on the receiving side operates the variable wavelength filter, to scan the wavelength, and examines whether or not a transmission request addressed to itself is sent out from the other station in a period during which it receives no data. The station on the receiving side starts communication at the time point where it detects that a transmission request from the other station is generated. In a period elapsed until communication is started, time required to propagate a signal on a transmission line and time required to scan the wavelength by the variable wavelength filter are necessarily required. That is, the synchronization of the stations need not be always established. However, the transmission efficiency of the information is not good, because information is not transmitted and received in a period elapsed from the time when the transmission request is generated until the destination responds to the transmittion request. The bus network has the possibility that the utilization efficiency of the transmission line is improved in simple construction because each of the terminals can recognize whether or not a signal from the previous terminals exists. Therefore, a proposition as described in the following fourth document has been made under the background that after a light amplifier is developed, the disadvantage with the above transmission loss can be overcome by using the light amplifier even in the bus network.

"Fourth Background Art"

FIG. 16 is a block diagram showing the construction of a U shaped bus optical network proposed in the fourth document "I. Chlamtac et al. "A Multibus Train Communication (AMTRAC) Architecture for High-Speed Fiber Optic Networks" IEEE Journal on Selected Areas in Communications Vol. 6 No. 6 pp.913–912, July 1988". In FIG. 16, each of terminals 1 to n comprises one wavelength variable transmitter and one receiver having a fixed wavelength. The terminals 1 to n send out, when they have information to be transmitted for each slot to a plurality of channels 1 to m upon establishment of slot synchronization, transmission information to a particular channel upon confirming that there is no transmission from the previous terminal.

In this system, communication is established for each slot, whereby slot synchronization must be established in the entire network. Consequently, the optical network has the same problem as the problem described in "Second Background Art". Further, the assignment of slots to be transmitted to the terminals is determined from the beginning, whereby the utilization efficiency of the transmission band is reduced.

"Fifth Background Art"

FIG. 17 is a block diagram showing the construction of "Optical Composite Transceiver" disclosed in U.S. Pat. No. 4,809,361. In FIG. 17, a transceiver (a connecting device) connects a plurality of terminals to an optical fiber cable, thereby constituting a U or S shaped bus optical network. In the bus optical network, a CSMA/CD (Carrier Sense Multiple Access with Collision Detection) system is utilized as an access method. That is, each of the terminals transmits data while examining whether or not data to be transmitted by itself collides with data to be transmitted by the other terminal. Each of the terminals stops the transmission at the time point where it detects the collision, while continuing the transmission when it does not detect the collision. It is considered that the transmission of data has succeeded when each of the terminals does not detect the collision until the transmission of the data is terminated.

In the CSMA/CD system, correct synchronization is not required in the entire optical network. In order to detect whether or not transmission data at a certain terminal collides with a transmission signal from the other terminal on an optical fiber cable, the transmission packet length must not be less than a packet length corresponding to the reciprocating time on a transmission line constituting the bus optical network. That is, the transmission efficiency is reduced by attaching dummy information in order to satisfy the minimum packet length even when short information is sent. Further, the possibility that transmission collision occurs is increased when the number of terminals is increased, whereby the transmission efficiency is reduced as the number of terminals is increased.

SUMMARY OF THE INVENTION

The above-mentioned optical network has a problem. For example, the construction of a network itself or a terminal becomes complicated, it takes long to establish data communication between terminals so that the transmission efficiency is not good, or the transmission efficiency of transmission data is reduced if the number of terminals connected to the network is increased.

Therefore, a first object of the present invention is to make it possible, in a bus network utilizing an optical fiber making it possible for each of stations to establish communication without performing optical/electrical conversion, for the station to establish communication by only a simple synchronization establishing method.

A second object of the present invention is to minimize, in a bus wavelength division multiplex network, an overhead period required to select a wavelength by the receiving side in a period required for transmission.

A third object of the present invention is to provide a network capable of efficiently transmitting transmission data even if many stations are connected to the network.

In order to attain the above-mentioned objects, a bus network according to the first invention is a bus network including a control station and a plurality of stations connected to each other through a transmission line. The source station transmits transmission information to the destination station. The basis of tokens periodically sent out by the control station. The transmission line comprises: an outbound transmission line, to which the source station is connected, for outputting an information transmission request or transmission information in response to the token inputted to the station, an inbound transmission line, to which the destination station is connected, for inputting the information transmission request or the transmission information sent out by the source station, and a control channel serving as a channel of the token and the information transmission request and a data channel serving as a channel of the transmission information. The source station sends out, after the information transmission request to the destination station is generated, the generated information transmission request to the outbound transmission line using the control channel after a first predetermined time since a first token first was received. The source station sends out, after the information transmission request to the destination station is generated, the transmission information to the outbound transmission line using the data channel after a second predetermined time since a second token was received. The destination station inputs the first token from the control channel of the inbound transmission line, and detects the information transmission request from the source station which is inputted after to the first token; and the destination station inputs the second token from the control channel of the inbound transmission line, and receives from the data channel the transmission information from the source station after the second predetermined time since the second token was inputted.

As described in the foregoing, the source station transmits information after the first predetermined time since the first token, which is received after the information transmission request is generated, was received, and sends out the transmission information to the outbound transmission line using the data channel after the second predetermined time since the second token was received. The source station is operated on the basis of the token. Therefore, the necessity of a mechanism such as slot synchronization in the entire network is eliminated, and the source station can be simply made.

Furthermore, the destination station receives from the data channel, upon selecting the information transmission request addressed to the destination station from the control channel, the information transmitted after the second predetermined time since the second token was received immediately after the selection. Even if the network is increased in scale, and the number of stations existing in the network is increased, therefore, time required until the information is transmitted after the transmission request signal is transmitted can be prevented from being extremely increased. Therefore, it is possible to provide a network having good information transmission efficiency.

The second invention is characterized in that in the first invention, the source station comprises a detection unit for detecting a non-signal period on the control channel in response to the receiving of the first token, and the source station judges that the station other than the source station sends out no information transmission request to the control channel, and the source station sends out the information transmission request of the source station to the control channel when the detection unit detects the first predetermined time as the non-signal period.

As described in the foregoing, the source station sends out the information transmission request after the detection unit detects the first predetermined time. Therefore, it is possible to prevent communication collision from occurring on the control channel.

The third invention is characterized in that in the second invention, the information transmission request comprises a first identifier indicating the destination station, a second identifier indicating the source station, and the generation time when the information transmission request is generated.

As described in the foregoing, the information transmission request contains the generation time when the information transmission request is generated. In the other station, therefore, it is possible to arbitrate on the basis of the generation time, even if information transmission requests are simultaneously transmitted from the different stations.

The fourth invention is characterized in that in the third invention, the transmission line in a bus shape is composed of an optical fiber, the data channel is assigned a wavelength, the wavelengths assigned to the data channels in the stations are not overlapped with each other, the control channel is assigned a wavelength which is not overlapped with any one of the wavelengths assigned to the data channels, and the control station converts the token into a light signal and sends out the light signal to the control channel. The source station comprises an information transmission request output unit for outputting an information transmission request depending on the results of the detection by the detection unit, a first light emission unit for converting the information transmission request outputted from the information transmission request output unit into a light signal and outputting the light signal to the control channel, a transmission information output unit for outputting transmission information in response to the second token, and a second light emission unit for converting the transmission information outputted from the transmission information output unit into a light signal and outputting the light signal to a data channel inherent in the source station. The destination station comprises a variable wavelength selection unit for selecting a light signal having the wavelength assigned to the data channel in the source station and passing the light signal having the wavelength, the variable wavelength selection unit selecting the wavelength assigned to the data channel inherent in the source station out of the wavelengths assigned to the data channel on the basis of an information transmission request received in response to the first token, and passing a light signal having the selected wavelength in response to the second token.

By the above-mentioned construction, it is possible to realize the control channel and the data channel in the same fiber by a wavelength division multiplexing technique. Further, the reliability is increased by utilizing the optical fiber for the transmission line, whereby long-distance transmission becomes possible.

The fifth invention is characterized in that in the third invention, the transmission line in a bus shape is composed of an optical fiber, the control station has a light emission unit emitting light having an inherent wavelength, and modulates a carrier having a first frequency assigned as the control channel by digital data which is a token signal, then converts the modulated carrier into a light signal, and sends out the light signal to the outbound transmission line. The source station comprises a first modulation unit for modulating the carrier having the first frequency assigned as the control channel by digital data which is an information transmission request signal depending on the results of the detection by the detection unit, a second modulation unit for modulating a carrier having a second frequency different from the first frequency and assigned as the data channel by digital data which is transmission information in response to the second token, and a light emission unit for converting a signal generated by the first modulation unit and/or the second modulation unit into a light signal having a wavelength which is not overlapped with any one of the wavelengths assigned to the other stations and the control station, and sending out the light signal to the outbound transmission line. The destination station comprises a variable wavelength selection unit for selecting a light signal having the wavelength inherent in the source station and passing the light signal having the wavelength, the variable wavelength selection unit selecting the wavelength assigned to the source station on the basis of an information transmission request received in response to the first token inputted from the inbound transmission line, and passing a light signal having the selected wavelength on the basis of the second token inputted from the inbound transmission line.

As described in the foregoing, the transmission line is composed of an optical fiber, and the control station and the stations respectively comprise light emission units for generating light signals having wavelengths which are not overlapped with each other. Moreover, the control channel and the data channel are multiplexed by an SCM (Sub-Carrier Multiplex) transmission system. By such construction, the control channel and the data channel can be realized within the same fiber by a wavelength division multiplexing technique. Further, high reliability and long-distance transmission become possible by utilizing the optical fiber for the transmission line. In addition, in each of the stations, the number of light components such as a high-cost light emitting device can be reduced.

The sixth invention is characterized in that in the fourth or fifth invention, the variable wavelength selection unit sets, when the first identifier included in the received information transmission request indicates the destination station, and the number of information transmission requests addressed to the destination station is one, the wavelength of the light signal to be passed on the basis of the second identifier.

The destination station can recognize that the station having the information transmission request addressed to itself exists by the first identifier stored in the information transmission request, and can simultaneously specify the source station having the information transmission request by the second identifier and set the wavelength passband of the variable wavelength selection unit. Consequently, the destination station can receive the information transmitted after the second predetermined time since the second token was received.

The seventh invention is characterized in that in the sixth invention, the variable wavelength selection unit sets, when the first identifier included in the received information transmission request indicates the destination station, and the number of information transmission requests addressed to the destination station is plural, the wavelength of the light signal to be passed on the basis of the second identifier.

By the above-mentioned construction, the destination station can receive, even when a plurality of stations each having the information transmission request addressed to itself exist, the transmission information from the source station where the information transmission request is generated at the earliest time, for example, on the basis of the time when the information transmission request is generated. Therefore, it is possible to provide a network to which the right to transmit information is equally given.

A bus network according to the eighth invention is a bus network including a control station and a plurality of stations connected to a loop-shaped bus through a transmission line. The source station transmits transmission information to the destination station in response to tokens periodically sent out by the control line. The transmission line comprises: an outbound transmission line, to which the source station is connected; for outputting an information transmission request or transmission information in response to the token inputted to the station, and an inbound transmission line, to which the destination station is connected, for inputting the information transmission request or the transmission information sent out by the source station. The transmission line is assigned a control channel serving as a channel of the token and the information transmission request and a data channel serving as a channel of the transmission information. The source station sends out, after the information transmission request to the destination station is generated, the generated information transmission request to the outbound transmission line using the control channel after a predetermined time since the first token was received. The source station sends out, after the information transmission request to the destination station is generated, the transmission information to the outbound transmission line using the data channel in response to the receiving of the second token. The destination station inputs the first token from the control channel of the inbound transmission line, and detects the information transmission request from the source station in response to the first token, and the destination station inputs the second token from the control channel of the inbound transmission line, and receives from the data channel the transmission information inputted from the source station in response to the second token.

As described in the foregoing, in the network composed of the loop-shaped bus transmission line, the source station transmits the information transmission request to the control channel after the first predetermined time since the first token transmitted immediately after the information transmission request is generated was received, and sends out the transmission information to the outbound transmission line using the data channel after the second predetermined time since the second token was received. The destination station receives, upon selecting the information transmission request addressed to the destination station from the control channel, the information transmitted after the second predetermined time since the second token was received immediately after the selection. Even if the number of stations existing in the network is increased, therefore, time elapsed from the time when the information transmission request is sent out until the transmission information is transmitted can be prevented from being extremely increased, whereby it is possible to provide the network having good information transmission efficiency.

The ninth invention is characterized in that in the eighth invention, the source station comprises a detection unit for detecting a non-signal period on the control channel in response to the receiving of the first token, and the source station judges that the station other than the source station sends out no information transmission request and sends out the information transmission request of the source station to the control channel when the detection unit detects the predetermined time as the non-signal period.

As described in the foregoing, the source station sends out the information transmission request after the detection unit detects the first predetermined time, whereby it can recognize that the previous station generates no information transmission request at timing subsequent to the token. Therefore, it is possible to prevent signal collision from occurring on the control channel.

The tenth invention is characterized in that in the ninth invention, the information transmission request comprises a first identifier indicating the destination station, a second identifier indicating the source station, the generation time when the information transmission request is generated, and the packet length of the transmission information sent out in response to the receiving of the second token.

As described in the foregoing, the information transmission request contains the generation time when the information transmission request is generated. In the other station, therefore, it is possible to arbitrate, even if information transmission requests from different stations are simultaneously received, the information transmission requests on the basis of the generation time. Further, the information transmission request contains the packet length. Therefore, the control station can determine the intervals between token signals depending on the packet size, whereby the transmission efficiency can be improved.

The eleventh invention is characterized in that in the tenth invention, a node on the outbound transmission line and the inbound transmission line comprises a branching unit for causing a signal on the transmission line to branch into two signals and outputting one of the signals to the control station, the control station has a function of detecting, when the first token is inputted from the branching unit, the maximum value of the packet length included in a transmission request packet subsequent to the first token, and the control station sets the sending intervals between the second token and the token sent out subsequently to the second token in response to the detected maximum value of the packet length.

Consequently, the control station can send out the tokens at intervals between tokens conforming to the maximum packet size required by each of the stations, and can efficiently utilize the transmission line. The twelfth invention is characterized in that in the eleventh invention, the loop-shaped bus transmission line is composed of an optical fiber, the data channel is assigned a wavelength, the wavelengths assigned to the data channel in the stations not being overlapped with each other, the control channel is assigned a wavelength which is not overlapped with any one of the wavelengths assigned to the data channel, the control station converts the token into a light signal and sends out the light signal to the control channel. The source station comprises an information transmission request output unit for outputting an information transmission request depending on the results of the detection by the detection unit, a first light emission unit for converting the information transmission request outputted from the information transmission request output unit into a light signal and outputting the light signal to the control channel, a transmission information output unit for outputting transmission information in response to the second token, and a second light emission unit for converting the transmission information outputted from the transmission information output unit into a light signal and outputting the light signal to a data channel inherent in the source station. The destination station comprises a variable wavelength selection unit for selecting a light signal having the wavelength assigned to the data channel in the source station and passing the light signal having the wavelength, the variable wavelength selection unit selecting the wavelength assigned to the data channel inherent in the source station out of the wavelengths assigned to the data channel on the basis of the information transmission request received in response to the first token, and passing a light signal having the selected wavelength in response to the second token.

By the above-mentioned construction, in the loop-shaped bus transmission line composed of an optical fiber, the wavelengths which are not overlapped with each other are assigned to the control channel and the data channels in the same fiber by a wavelength division multiplexing technique. Therefore, it is possible to provide a reliable network which is suitable for long-distance transmission.

The thirteenth invention is characterized in that in the eleventh invention, the loop-shaped bus transmission line is composed of an optical fiber, the control station has a light emission unit emitting light having an inherent wavelength, and modulates a carrier having a first frequency assigned as the control channel by digital data which is a token signal, then converts the modulated carrier into a light signal by the light emission unit and sends out the light signal to the outbound transmission line. The source station comprises a first modulation unit for modulating the carrier having the first frequency by digital data which is an information transmission request signal depending on the results of the detection by the detection means, a second modulation unit for modulating a carrier having a second frequency different from the first frequency and assigned as the data channel by digital data which is transmission information in response to the second token, and a light emission unit for converting a signal generated by the first modulation unit and/or the second modulation unit into a light signal having a wavelength which is not overlapped with any one of the wavelengths assigned to the other stations and the control station, and sending out the light signal to the outbound transmission line. The destination station comprises a variable wavelength selection unit for selecting a light signal having the wavelength inherent in the source station and passing the light signal having the wavelength, the variable wavelength selection unit selecting the wavelength assigned to the source station on the basis of the information transmission request received in response to the first token inputted from the inbound transmission line, and passing a light signal having the selected wavelength on the basis of the second token inputted from the inbound transmission line.

As described in the foregoing, the loop-shaped bus transmission line is composed of an optical fiber, and the control station and the stations respectively comprise light emission units for generating light signals having wavelengths which are not overlapped with each other. Moreover, the control channel and the data channel are multiplexed by an SCM (Sub-Carrier Multiplex) transmission system. Consequently, it is possible to provide a network which is reliable and suitable for long-distance transmission. Further, in each of the stations, it is possible to reduce the number of light components such as a high-cost light emitting device.

The fourteenth invention is characterized in that in the twelfth or thirteenth invention, the variable wavelength selection unit sets, when the first identifier included in the received information transmission request indicates the destination station, and the number of information transmission requests addressed to the destination station is one, the wavelength of the light signal to be passed on the basis of the second identifier.

The destination station can recognize that the station having the information transmission request addressed to the destination station exists by the first identifier contained in the information transmission request, and simultaneously specify the source station having the information transmission request by the second identifier and set the wavelength passband of the variable wavelength selection unit. Consequently, the destination station can receive the information transmitted after the second predetermined time since the token was subsequently received.

The fifteenth invention is characterized in that in the fourteenth invention, the variable wavelength selection unit sets, when the first identifier included in the received information transmission request indicates the destination station, and the number of information transmission requests addressed to the destination station is plural, the wavelength of the light signal to be passed on the basis of the second identifier and the generation time.

As described in the foregoing, the destination station can receive the transmission information from the source station where the information transmission request is generated at the earliest time, whereby it is possible to provide the network to which the right to transmit information is equally given.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a block diagram showing the detailed construction of a station used for a bus network in a second embodiment of the present invention;

DESCRIPTION OF THE PREFERRED EMBODIMENTS (First Embodiment)

Figure 1:
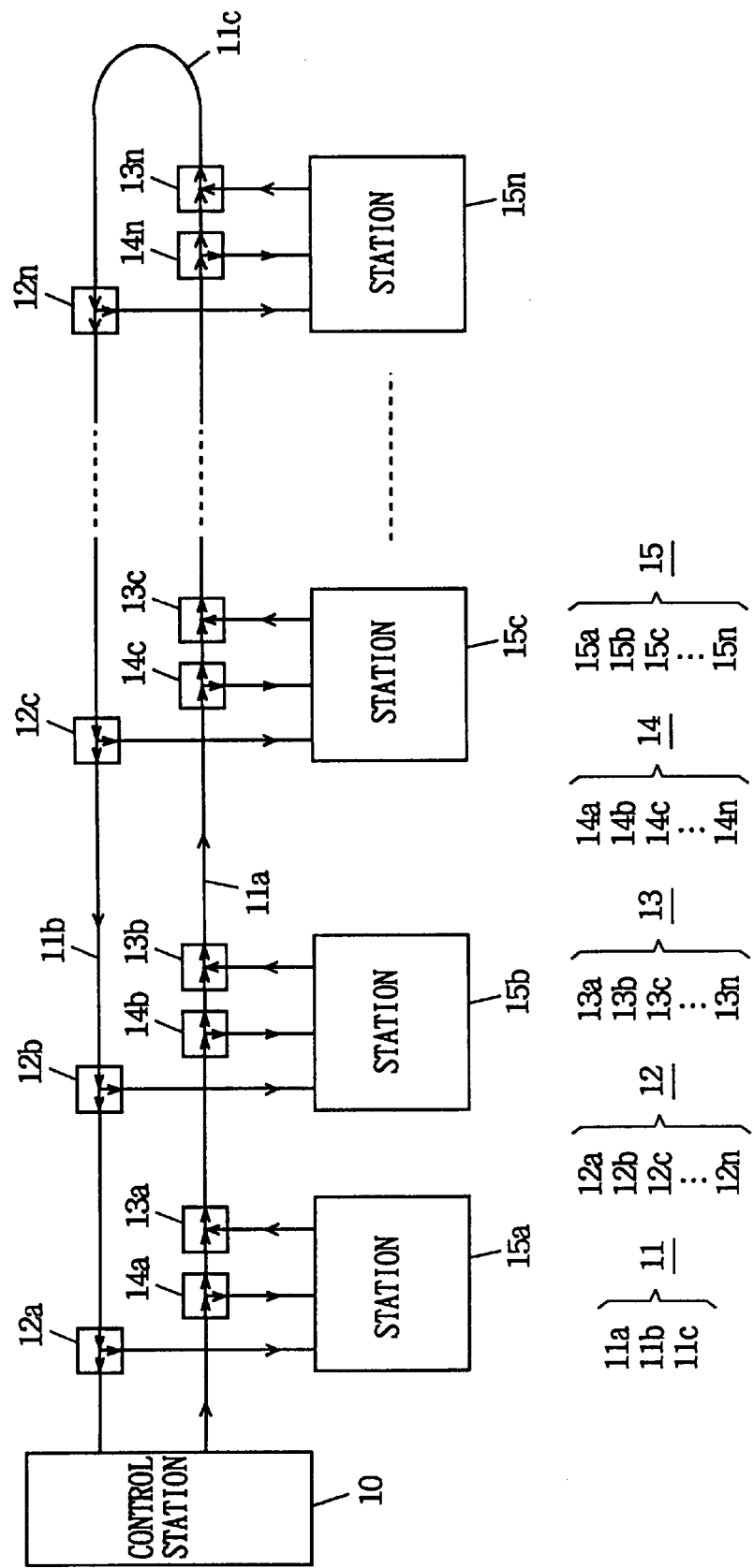
FIG. 1 is a block diagram showing the entire construction of a bus network according to a first embodiment of the present invention.

FIG. 1 is a block diagram showing the construction of a bus network according to a first embodiment of the present invention. In FIG. 1, in the bus network, a control station 10 for periodically sending out tokens onto a control channel and a plurality of stations 15 (four stations 15a to 15c and 15n are illustrated), to and from which a token and a transmission request packet are inputted and outputted, for transmitting and receiving an information packet are connected to a folded bus transmission line 11. More specifically, the folded bus transmission line 11 comprises an outbound bus transmission line 11a used for the station 15 outputting the information packet, for example, an inbound bus transmission line 11b used for the station 15 inputting the information packet, for example, and a bus transmission line for connection 11c for connecting both the transmission lines. In the control station 10, its output terminal for outputting the token is connected to the outbound transmission line 11a, and its input terminal to which the token is inputted is connected to the inbound bus transmission line 11b. Further, each of the stations 15 is connected to the outbound bus transmission line 11a by an optical branching device 14 and an optical coupling device 13, and is connected to the inbound bus transmission line 11b by an optical branching device 12.

Figure 2:
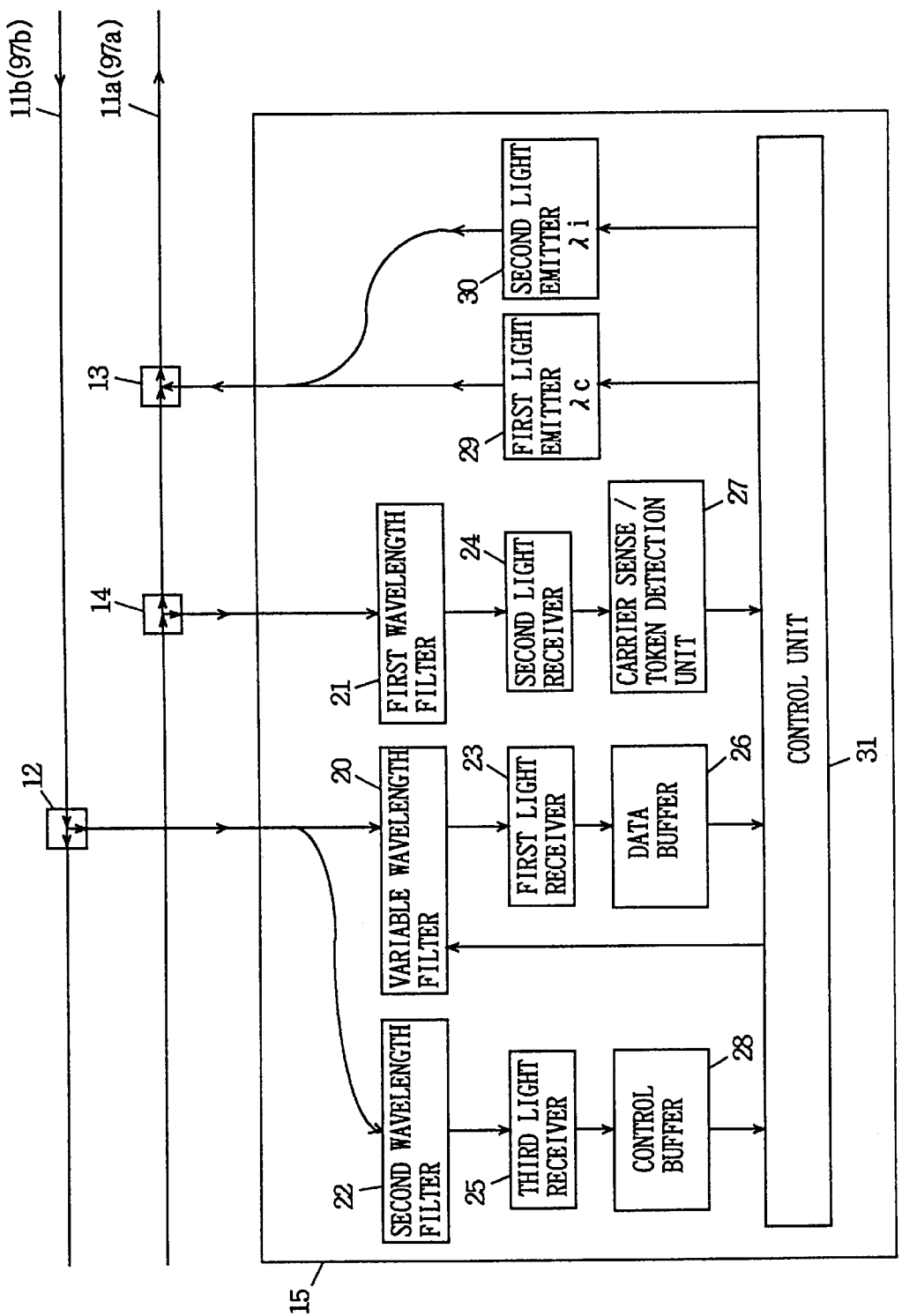
FIG. 2 is a block diagram showing the detailed construction of a station 15 shown in FIG. 1.

FIG. 2 is a block diagram showing the detailed construction of the station 15 shown in FIG. 1. In FIG. 2, the station 15 comprises a variable wavelength filter 20, a first wavelength filter 21, a second wavelength filter 22, first to third light receivers 23 to 25, a data buffer 26, a carrier sense/token detection unit 27, a control buffer 28, a first light emitter 29, a second light emitter 30, and a control unit 31.

The variable wavelength filter 20 passes only a light signal having a wavelength set by the control unit 31, that is, a light signal transmitted on a data channel (having a wavelength of $\lambda i$) out of light signals obtained upon branching by the optical branching device 12.

The first wavelength filter 21 passes only a light signal transmitted on a control channel (having a wavelength of $\lambda c$) out of light signals obtained upon branching by the optical branching device 14.

The second wavelength filter 22 passes only a light signal transmitted on the control channel out of the light signals obtained upon branching by the optical branching device 12.

The first light receiver 23 converts the light signal on the data channel which passed through the variable wavelength filter 20 into an electrical signal.

The second light receiver 24 and the third light receiver 25 convert the light signals on the control channel which passed through the first wavelength filter 21 and the second wavelength filter 22 into electrical signals.

The data buffer 26 stores the electrical signal obtained upon optical/electrical conversion by the first light receiver 23, i.e., an information packet.

The carrier sense/token detection unit 27 demodulates the electrical signal on the control channel obtained upon optical/electrical conversion by the second light receiver 24, to receive a token. The carrier sense/token detection unit 27 further judges whether or not a signal (a transmission request packet from the previous station) is sent out onto the control channel.

The control buffer 28 stores the electrical signal obtained upon optical/electrical conversion by the third light receiver 25, that is, a token and a transmission request packet.

The first light emitter 29 is set to the wavelength $\lambda c$ for the control channel, and converts a transmission request packet generated by the control unit 31, as described later, into a light signal and outputs the light signal.

The second light emitter 30 is set to a wavelength $\lambda i$ which differs for each station, and converts an information packet generated by the control unit 31, as described later, into a light signal and outputs the light signal. In the present embodiment, the second light emitters 30 in the stations 15a to 15c and 15n are respectively set to wavelengths $\lambda a$ to $\lambda c$ and $\lambda n$. The control unit 31 controls the variable wavelength filter 20, to control communication between the stations.

Figure 3:
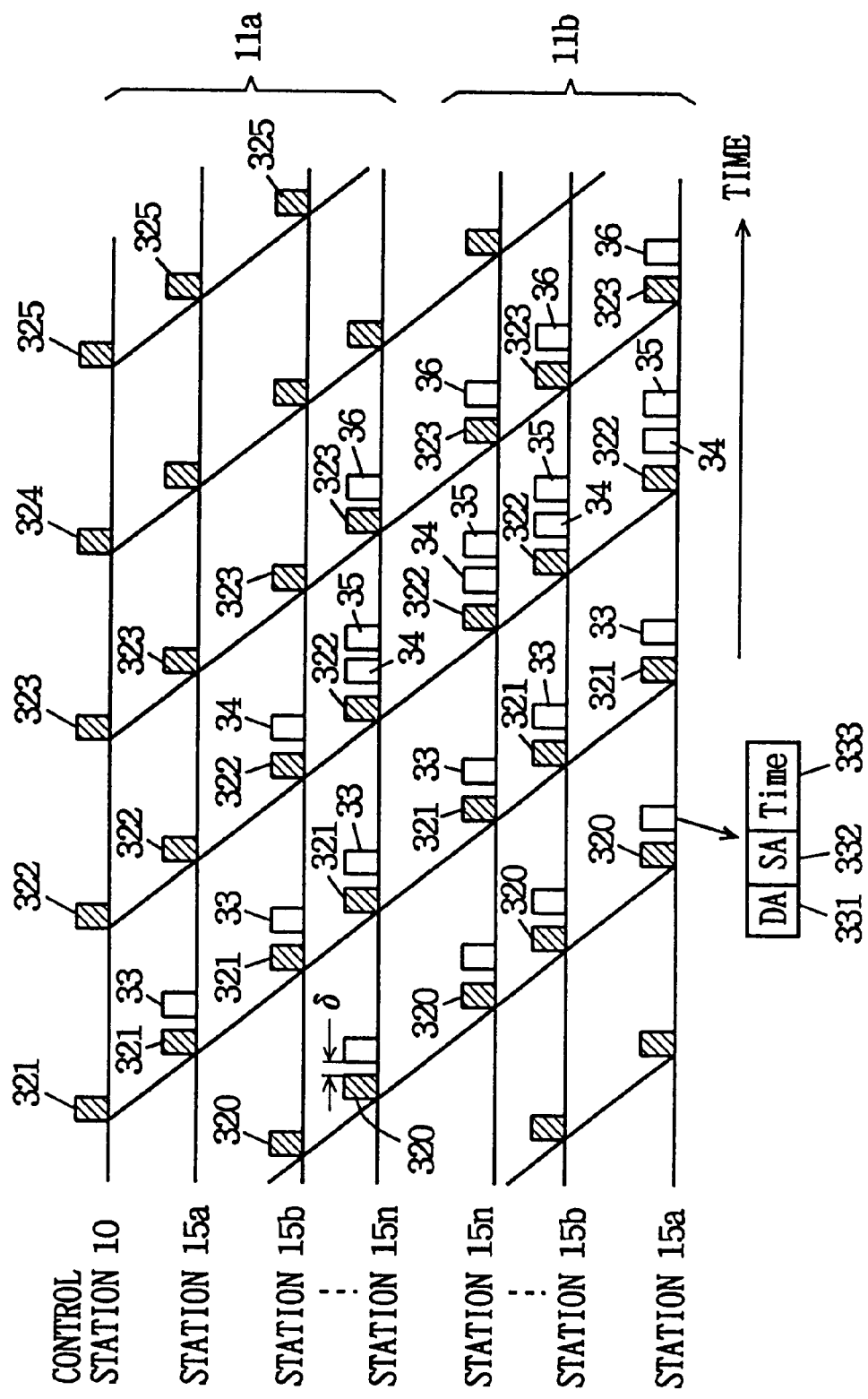
FIG. 3 is a diagram showing the timing of sending out a token by a control station 10 and sending out a transmission request packet by each of stations, and the timing of propagating the token and the transmission request packet.

FIG. 3 is a diagram showing the timing of sending out a token by the control station 10 and sending out a transmission request packet by each of the stations and the timing of propagating the token and the transmission request packet. In FIG. 3, tokens 320 to 325 are periodically sent out from the control station 10.

The transmission request packet is a packet for notifying the other station that it is desired to transmit an information packet including transmission information, and is sent out in response to the received token. A transmission request packet 33 is sent out in response to the token 321 by the station 15a. A transmission request packet 34 is sent out in response to the token 322 by the station 15b. Transmission request packets 35 and 36 are sent out in response to the tokens 322 and 323 by the station 15n. Further, the format of each of the transmission request packets comprises a destination field (illustrated as DA) 331 for storing an identifier indicating a destination station, a source field (illustrated as SA) 332 for storing an identifier indicating a source station, and a time field (illustrated as Time) 333 for storing the time when a transmission request is generated inside of each of the stations 15.

Figure 4:
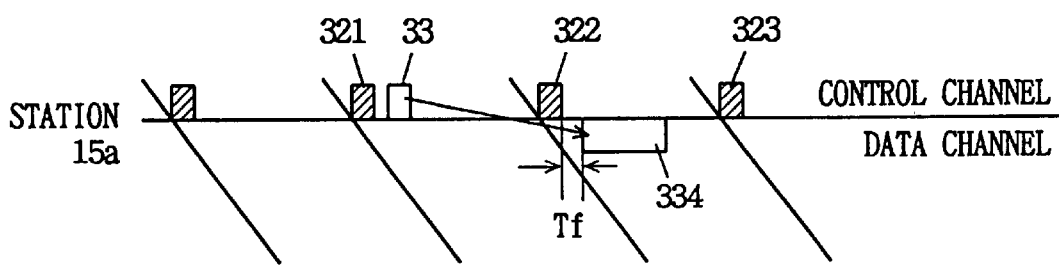
FIG. 4 is a diagram showing the timing of the station 15 shown in FIG. 1 transmitting a transmission request packet onto a control channel, and then transmitting an information packet onto a data channel.

FIG. 4 is a diagram showing the timing of the station 15a transmitting the transmission request packet 33, and then transmitting an information packet 334. In FIG. 4, the station 15a sends out the transmission request packet 33 in response to the token 321. The station 15a receives the token 322 transmitted subsequently to the token 321, then converts the information packet 334 into a light signal by the second light emitter (having a wavelength of λa) in its inside at intervals of time Tf, and sends out the light signal (see FIG. 3). The time Tf is time required to tune the wavelength of the variable wavelength filter 20 in each of the stations 15.

Figure 5:
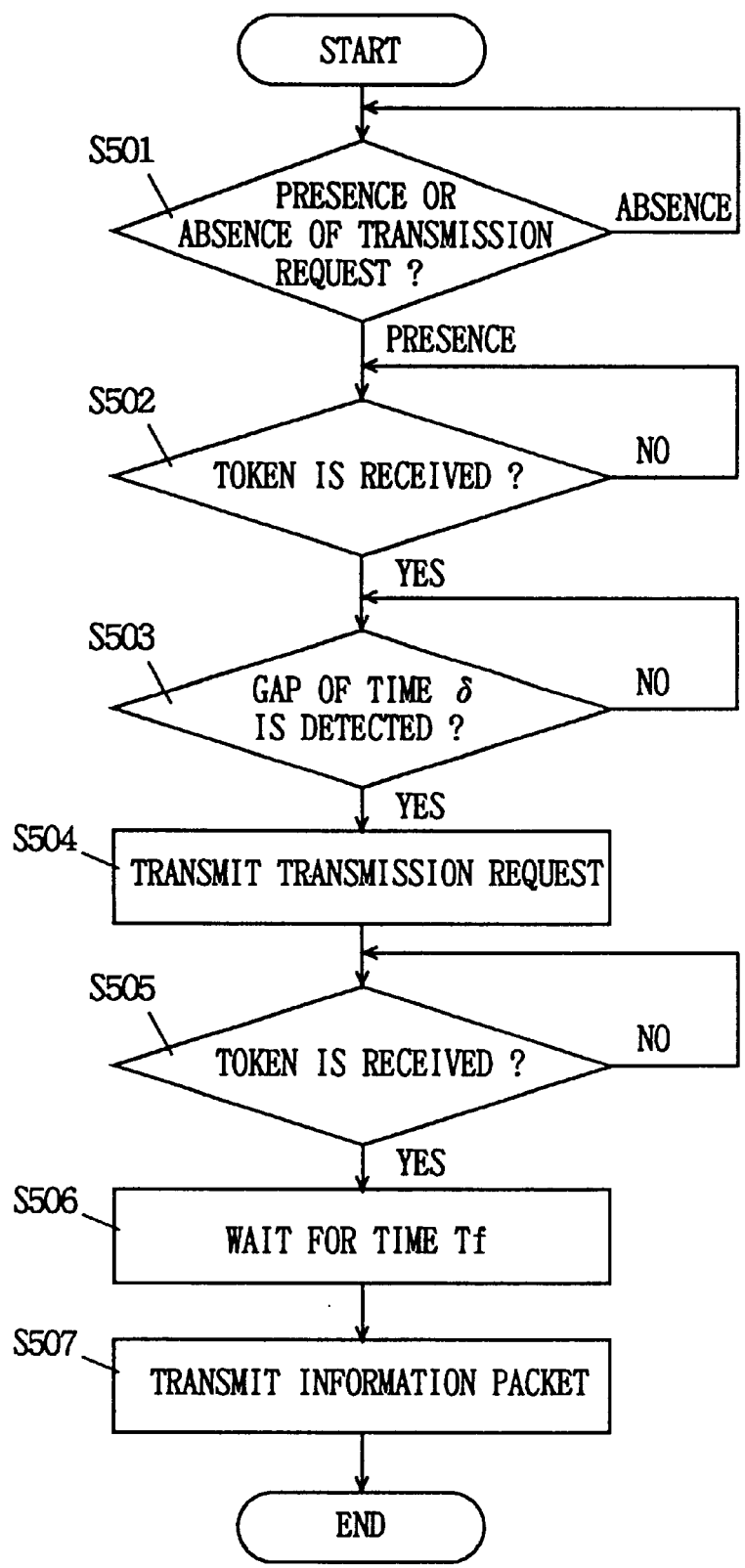
FIG. 5 is a flow chart showing the procedure for processing in a station 15 from the time when a transmission request is generated to the time when an information packet is sent out onto a data channel.
Figure 6:
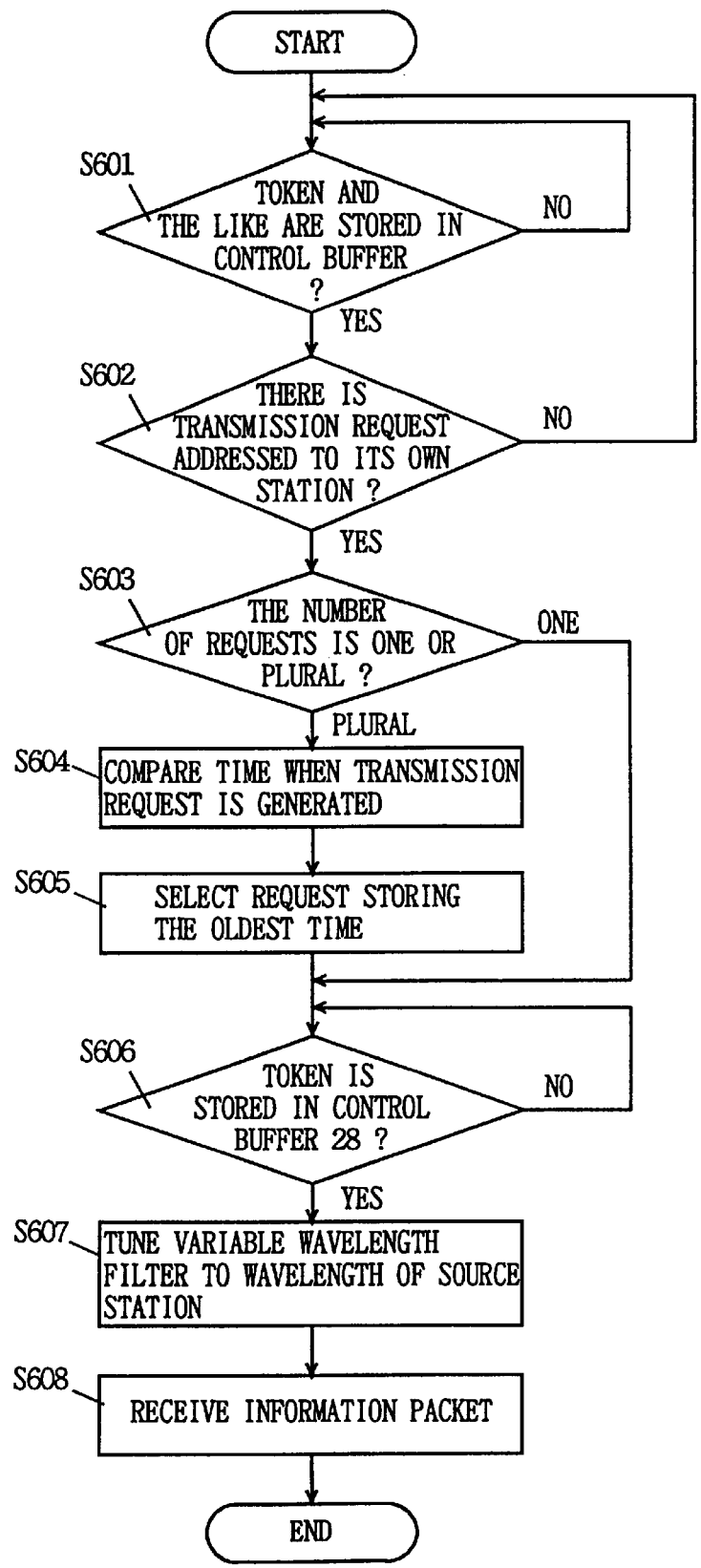
FIG. 6 is a flow chart showing the procedure for processing performed by a station 15 for receiving an information packet.

FIG. 5 is a flow chart showing the procedure for processing in the station 15 from the time when a transmission request is generated to the time when an information packet is sent out onto the data channel. FIG. 6 is a flow chart showing the procedure for processing performed by the station 15 for receiving an information packet. As a specific example of sending and receiving of an information packet between stations, a case where the station 15a transmits an information packet to the station 15n with reference to FIGS. 1 to 6.

The control station 10 first sends out the token 320 to the outbound bus transmission line 11a using the control channel (having a wavelength of λc). The token is successively inputted to the stations 15a to 15n. In the station 15a, a request to transmit an information packet to the station 15b is generated after the token 320 is received and before the token 321 is received (step S501 in FIG. 5). It is assumed that in the stations other than the station 15a, no transmission request is generated after the token 320 is received and before the token 321 is received.

The optical branching device 14a causes a light signal transmitted on the outbound bus transmission line 11a to branch into two light signals, and respectively outputs one of the light signals and the other light signal to the station 15a and the subsequent station 15. The first wavelength filter 21 in the station 15a passes only the light signal having a wavelength of λc out of the inputted light signals. The second light receiver 24 converts the light signal inputted from the first wavelength filter 21 into an electrical signal, and outputs the electrical signal to the carrier sense/token detection unit 27. The carrier sense/token detection unit 27 decodes the inputted electrical signal, and receives a token (step S502). The carrier sense/token detection unit 27 then detects whether or not it receives an electrical signal during a gap of time δ after receiving the token 321 in consideration of a case where the station 15 previous to the station 15a sends out a transmission request packet (step S503). The control unit 31 judges that there is no transmission request packet from the previous station at the time point where the gap of time δ is confirmed by the carrier sense/token detection unit 27, and judges that no communication collision, for example, occurs even if it sends out a transmission request packet onto the control channel of the outbound bus transmission line 11a. The control unit 31 then generates a transmission request packet 33 on the basis of the above-mentioned transmission request, and outputs the transmission request packet 33 to the first light emitter 29. In the transmission request packet 33, an identifier indicating the station 15n is set in the destination field 331, and an identifier indicating the station 15a is set in the source field 332, and the time when a transmission request is generated in the station 15a is set in the time field 333. The first light emitter 29 converts the inputted transmission request packet 33 into a light signal, and sends out the light signal onto the control channel (having a wavelength of λc) (step S504).

The light signal obtained by converting the transmission request packet 33 is coupled to the other token 321 outputted upon branching by the optical branching device 14a by the optical coupling device 13a. The optical coupling device 13a outputs the token 321 and the transmission request packet 33 which are coupled to each other toward the subsequent station.

As described above, only the station 15a responds to the token 321, to output the transmission request packet 33. Consequently, the token 321 and the transmission request packet 33 are transmitted in a state where only the transmission request packet 33 succeeds the token 321 (see FIG. 3).

When each of the stations does not have a transmission request at the time point where it receives a token, the station only receives the token, and does not perform the above-mentioned responding operation.

The light signal (the token 321 and the transmission request packet 33) is transmitted to the inbound bus transmission line 11b through the bus transmission line for connection 11c from the outbound bus transmission line 11a. When the token 321 or the like is inputted to each of the stations 15 through the optical branching device 12 positioned halfway on the inbound bus transmission line 11b, operations performed by the station at this time will be described later.

The control station 10 sends out the token 322 to the outbound bus transmission line 11a after a predetermined time since it sent out the token 321. In the station 15a, the carrier sense/token detection unit 27 notifies, upon receiving the token 322 in the same manner as that in the foregoing step S502 (step S505), the control unit 31 that the token is received. The control unit 31 outputs to the second light emitter 30 the information packet 334 to be transmitted to the station 15n after waiting for only time Tf from the time when the token 322 is received by the carrier sense/token detection unit 27 (step S506). The time Tf is time required to tune the wavelength of the variable wavelength filter 20 in each of the stations 15, as described above. The second light emitter 30 converts the information packet 334 into a light signal, and sends out the light signal onto the data channel (having a wavelength of λa) (see step S507 in FIG. 4). Although description was made of the timing of transmission with respect to the information packet 334 sent out in response to the token 322, the station for sending out a transmission request packet in response to the token 322 performs the same processing as that in the steps S501 to S504 shown in FIG. 5, as described later.

Description is now made of the procedure for receiving an information packet in each of the stations 15.

The optical branching device 12n located halfway on the inbound bus transmission line 11b causes the light signal (the token 321 and the transmission request packet 33) to branch into two light signals, and respectively outputs one of the light signals and the other light signal toward the station 15n and the subsequent station. The second wavelength filter 22 in the station 15n passes only the light signal on the control channel (having a wavelength of λc). The third light receiver 25 converts the light signal inputted from the second wavelength filter 22 into an electrical signal, and outputs the electrical signal to the control buffer 28. Consequently, the control buffer 28 stores the token 321 and the transmission request packet 33 (step S601 in FIG. 6). The control unit 31 retrieves a destination field 331 included in one or a plurality of transmission request packets stored in the control buffer 28 (there may, in some cases, be no transmission request packet). The control unit 31 judges whether or not there is a transmission request packet storing an identifier indicating the station 15n in the retrieval (step S602). When the control unit 31 judges that there is no transmission request packet storing an identifier indicating the station 15n in the operation in the step S602, the control unit 31 proceeds to the operation in the step S601. In the operation in the step S601, the control unit 31 waits until the subsequent token and the request packets are stored in the control buffer 28. On the other hand, when the control unit 31 judges that there is a transmission request packet storing an identifier indicating the station 15n in the operation in the step S602, the control unit 31 examines whether the number of transmission request packets storing an identifier indicating the station 15n is one or plural (step S603). Only the token 321 and the transmission request packet 33 are currently stored in the control buffer 28. Consequently, the control unit 31 judges that the number of transmission request packets addressed to the station 15n is one, and then proceeds to the operation in the step S606. Operations performed in a case where the number of transmission request packets addressed to the station 15n is plurality will be described later.

The control unit 31 waits until the subsequent token 322 is stored in the control buffer 28 (step S606). The control unit 31 refers to a table (not shown) previously prepared when the token 322 and the request packets are stored in the control buffer 28, and tunes the wavelength passband of the variable wavelength filter 20 to the wavelength λa of the data channel used by the station 15a which is a source of the transmission request packet 33 (step S607). Identifiers indicating all the stations 15 and the wavelengths of data channels used by the stations are recorded in relation to each other on the table. A light signal transmitted on the data channel (having a wavelength of λa) is caused to branch into two light signals by the optical branching device 12n, and the light signals are inputted to the first light receiver 23 after the time Tf since the station 15n received the token 322 through the wavelength variable filter 20 set to the wavelength passband λa. The first light receiver 23 converts the inputted light signal into an electrical signal, and outputs the electrical signal to the data buffer 26. The data buffer 26 stores the information packet 334 which is the electrical signal (step S608), whereby the sending and receiving of the information packet from the station 15a to the station 15n are completed.

Furthermore, each of the stations 15 subsequent to the station 15n on the inbound bus transmission line 11b also performs processing conforming to the flow chart of FIG. 6 in response to input of the token 321. Since the station 15 judges that there is no transmission request addressed to itself in the processing in the step S602, however, the station 15 waits until the subsequent token is transmitted.

The flow chart of FIG. 6 shows processing corresponding to a transmission request subsequent to one token. However, each of the stations 15 may be so constructed that the processing in the steps S601 to S605 and the processing in the steps S606 to S608 are independently performed, and receiving operations can be performed for each token.

Description is now made of a case where the plurality of stations 15b and 15n transmit transmission request packets to the same station 15a.

The token 322 sent out from the control station 10 is successively inputted to the station 15a and the respective stations. The station 15b performs operations in the step S502 and the subsequent steps when a transmission request is generated after the token 321 is received and before the token 322 is received (step S501 in FIG. 5). The processing in the step S502 and the subsequent steps is the same as the foregoing processing and hence, the description thereof is simplified. The carrier sense/token detection unit 27 detects whether or not an electrical signal is received during a gap of time δ (step S503) after the token 322 is received (step S502). The control unit 31 generates the transmission request packet 34 and outputs the generated transmission request packet 34 to the first light emitter 29 when the gap of the time δ is confirmed by the carrier sense/token detection unit 27. In the transmission request packet 34, an identifier indicating the station 15a is set in the destination field 331, an identifier indicating the station 15b is set in the source field 332, and the time T1 when a transmission request is generated in the station 15b is set to the time field 333. The transmission request packet 34 is converted into a light signal (having a wavelength of λc) by the first light emitter 29, and is sent out onto the control channel of the outbound bus transmission line 11a through the optical coupling device 13b (see FIG. 3). The station 15n also detects the gap of time δ after the transmission request packet 34 by the carrier sense/token detection unit 27 in the station 15n performing the operations in the steps S502 and S503 when a transmission request is generated subsequently to the token 321 being received and before the token 322 is received (step S501). The control unit 31 generates the transmission request packet 35 and outputs the transmission request packet 35 to the first light emitter 29 when the gap of time δ is confirmed. In the transmission request packet 35, an identifier indicating the station 15a is set in the destination field 331, an identifier indicating the station 15n is set in the source field 332, and time T2 when a transmission request is generated in the station 15b is set in the time field 333. The time T2 shall be time later than the time T1. The transmission request packet 35 is converted into a light signal (having a wavelength of λc) by the first light emitter 29, and is sent out onto the control channel of the outbound bus transmission line 11a through the optical coupling device 13n. At this time, the transmission request packets 34 and 35 succeed the token 322 (see FIG. 3).

Although the time δ in the carrier sense/token detection unit 27 is described as the same value in the stations, it is strictly desirable for obtaining stable operations that the more subsequent the station is, the larger a value set thereto is.

The station 15b converts an information packet to be transmitted to the station 15a into a light signal (having a wavelength of λb) after the time Tf since the token 323 transmitted subsequently to the token 322 was received, and sends out the light signal onto the data channel. The station 15n also converts an information packet to be transmitted to the station 15a into a light signal (having a wavelength of λn), and sends out the light signal onto the data channel when the time Tf has elapsed since the token 323 was received.

Description is now made of the procedure for receiving an information packet in the station 15a. The token 322 or the like which is a light signal is transmitted on the inbound bus transmission line 11b through the bus transmission line for connection 11c from the outbound bus transmission line 11a. The token 322 or the like is successively inputted to the station 15n and the respective stations. When the control unit 31 in the station 15a carries out the steps S601 to S603 (see FIG. 6) as in the foregoing, that is, the control unit 31 judges that there is a transmission request packet addressed to the station 15a (step S602) when the token 322 and the request packets are stored in the control buffer 28 (step S601). Moreover, the control unit 31 judges that there are two transmission request packets addressed to the station 15a (step S603). Therefore, the control unit 31 proceeds to the operation in the step S604. The control unit 31 then compares the time fields 333 stored in the transmission request packets addressed to the station 15a (step S604), and selects the transmission request packet storing the time field in which the oldest time is set out of the time fields 333 (step S605). Consequently, the control unit 31 compares the time T1 and the time T2, to judge that the time T1 is older than the time T2. The control unit 31 determines that it receives an information packet from the station 15b in accordance with the judgment.

The control unit 31 tunes the wavelength passband of the variable wavelength filter 20 to the wavelength λb (step S607), and receives the information packet from the station 15b when the token 323 is stored in the control buffer 28 (step S606).

As described above, the control unit 31 in the station 15a sets the wavelength of the variable wavelength filter 20 in its inside to the wavelength λb, and receives the information packet from the station 15b. Therefore, the stations 15b and 15n perform confirming operations as to whether or not information packets sent out by themselves are received by the station 15a. Description is now made of the confirming operations of the stations 15b and 15n which transmit the transmission request packets to the station 15a.

The token 322 or the like transmitted on the inbound bus transmission line 11b is also inputted to the station 15n and the station 15b. Description is now made of operations performed by the station 15b in a case where the information packet sent out by itself is received by the station 15a although the order of inputting the token 322 is reversed.

The station 15b performs the subsequent processing, and performs processing as described below when the token 322 and the transmission request packets 34 and 35 are stored in the control buffer 28 (step S601 in FIG. 6). The control unit 31 in the station 15b retrieves the destination field 31, and examines whether or not the stations other than the station 15b send out transmission request packets to the same station (the station 15a in the present embodiment). In this case, the control unit 31 finds out an identifier indicating the station 15a in the destination field 331 included in the transmission request packet 35 sent out by the station 15n. Consequently, the control unit 31 in the station 15b recognizes that the station 15n sends out the transmission request packet to the station 15a using the same token, then examines the time T2 stored in the time field 333 included in the transmission request packet 35, and compares the time T2 with the time T1 stored in the time field 333 included in the transmission request packet 34. As described above, the time T1 is time older than the time T2, whereby the control unit 31 in the station 15b judges that an information packet sent out by itself is received by the station 15a.

The station 15n also performs the same confirming operations as those performed by the station 15b when the token 322 and the like are stored in the control buffer 28 (step S601). The control unit 31 in the station 15n retrieves the destination field 331, and examines whether or not the stations other than the station 15n send out transmission request packets to the same station (the station 15a in the present embodiment). In this case, the control unit 31 finds out an identifier indicating the station 15a in the destination field 331 included in the transmission request packet 34 sent out by the station 15b. Consequently, the control unit 31 in the station 15n recognizes that the station 15b sends out the transmission request packet to the station 15a using the same token, then examines the time T1 stored in the time field 333 included in the transmission request packet 34, and compares the time T1 with the time T2 stored in the time field 333 included in the transmission request packet 35. As described above, the time T2 is time newer than the time T1, whereby the control unit 31 in the station 15n judges that an information packet sent out by the station 15b is received by the station 15a. The control unit 31 in the station 15n carries out the steps S502 to S507 shown in FIG. 5 in response to the token 323 subsequently received, and sends out the transmission request packet 36 having the same contents as those of the transmission request packet 35 again on the basis of the results of the judgment (see FIG. 3).

When only one station 15 transmits a transmission request packet, the station 15 performs the above-mentioned confirming operations. This is not described in the description in a case where the station 15a sends out an information packet. It should be noted that this is for simplification and clarification of the description and has no other intention.

Furthermore, each of the optical branching devices 12 unconditionally outputs a light signal transmitted on the inbound bus transmission line 11b to the variable wavelength filter 20. In a case where the station 15a transmits an information packet to the station 15b as in the above-mentioned embodiment, for example, when the wavelength passband of the variable wavelength filter 20 in the station 15c is accidentally set to the wavelength λa used by the station 15a, the station 15c also receives the information packet. As the measure for coping with such circumstances, the measure for abandoning an information packet accidentally received without carrying out the procedure shown in FIG. 6 is considered. This applies to bus networks according to second and third embedments described in the following.

(Second Embodiment)

Description is now made of a second embodiment. The entire construction of a bus network according to the present embodiment is approximately the same as the construction of the bus network shown in FIG. 1 and hence, the detailed description thereof is omitted. The bus network according to the present embodiment differs from the bus network described in the first embodiment in that a wavelength multiplex system and an SCM (Sub-Carrier Multiplex) system are applied and in the internal structures of a control station 10 and each of stations 15.

Figure 7A:
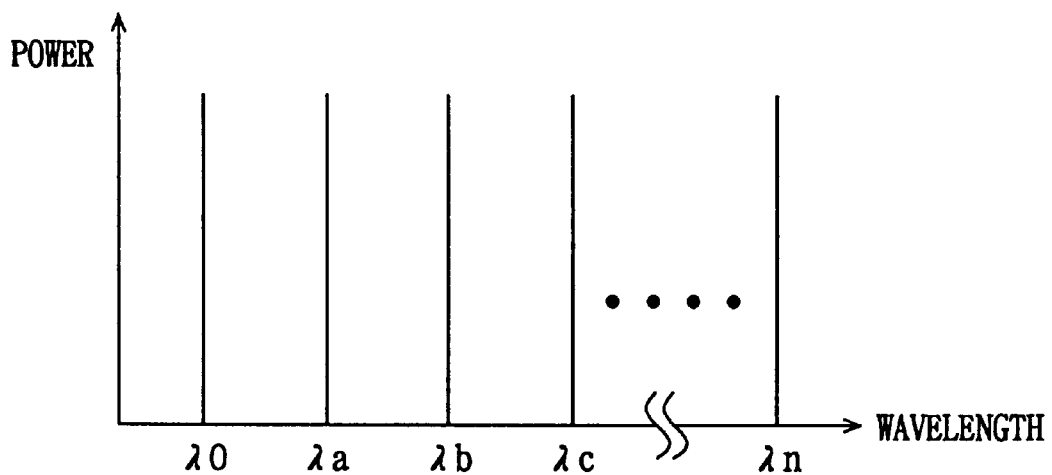
FIG. 7 is a diagram for explaining a method of assigning channels by an SCM transmission system.
Figure 7B:
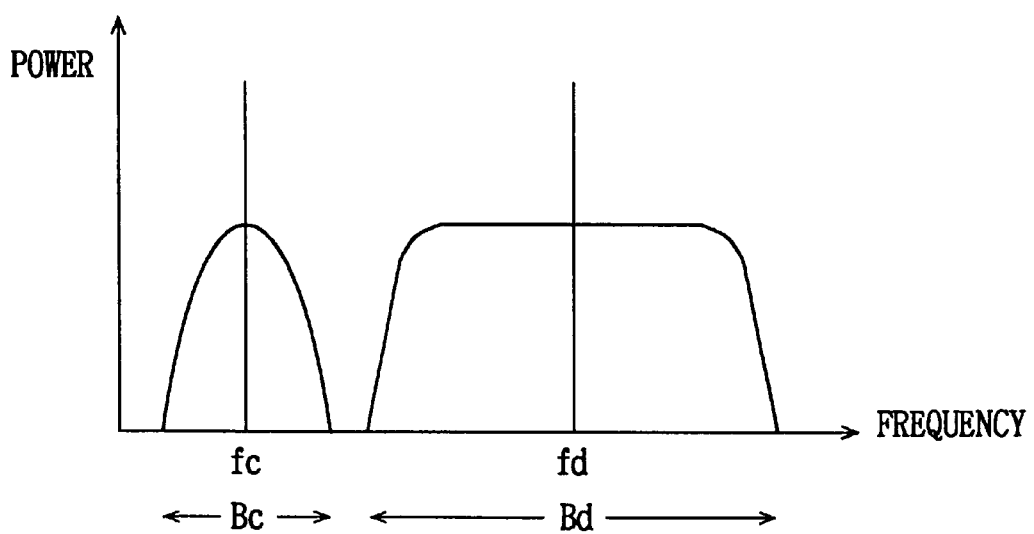

FIG. 7 is a diagram for explaining a method of assigning channels using the SCM transmission system. FIG. 7(a) is a diagram showing the spectrum of the wavelengths of light emitters included in a control station 10 and stations 15. In FIG. 7(a), a wavelength λ0 is assigned to the control station 10, and wavelengths λa to λc and λn are assigned to the stations 15a to 15c and 15n. The wavelengths λ0, λa to λc and λn are wavelengths which are not overlapped with each other. FIG. 7(b) is a diagram showing that carrier signals fc and fd used by each of the stations are modulated by a transmission request packet and an information packet, and are enlarged to bands Bc and Bd. In FIG. 7(b), in each of the stations 15, the carrier signals fc and fd are related to a transmission request packet and an information packet, and are modulated by a digital modulation system such as QAM (Quadrature Amplitude Modulation) or PSK (Phase Shift Keying), and are enlarged to the bands Bc and Bd. The carrier signal fc is shared by the control station 10 and each of the stations 15, and the carrier signal fd is used independently by each of the stations 15.

FIG. 8 is a block diagram showing the detailed construction of the station 15 in the bus network according to the second embodiment. In FIG. 8, the station 15 comprises a variable wavelength filter 710, first to third light receiver 711 to 713, first and second demodulation/decoding units 721 and 722, a demodulation/carrier sense/decoding unit 723, a control buffer 731, a data buffer 732, first and second encoding/modulation units 741 and 742, a multiplexing unit 75, a light emitter 76, and a control unit 77.

The variable wavelength filter 710 selects only a light signal in a wavelength band set by the control unit 77 as described later out of light signals inputted from an inbound bus transmission line 11b by an optical branching device 12 and passes the selected light signal.

Each of the first to third light receivers 711 to 713 collectively converts the inputted light signals into electrical signals.

The first demodulation/decoding unit 721 has a band-pass filter (not shown) in its inside, and passes the electrical signals inputted from the first light receiver 711 through the band-pass filter and extracts only a transmission signal on a control channel. The first demodulation/decoding unit 721 demodulates the extracted transmission signal on the control channel, and receives a token signal and a transmission request packet (or only a token signal). The control buffer 731 stores the transmission request packet received by the first demodulation/decoding unit 721.

The second demodulation/decoding unit 722 has a band-pass filter (not shown) (in a passband Bd) in its inside, and passes the electrical signals inputted from the second light receiver 712 through the band-pass filter and extracts only a transmission signal on a data channel. The second demodulation/decoding unit 722 demodulates the extracted transmission signal on the data channel, and receives an information packet. The data buffer 732 stores the information packet received by the second demodulation/decoding unit 722.

The demodulation/carrier sense/decoding unit 723 has a band-pass filter (not shown) (in a passband BC) in its inside, and passes the electrical signals inputted from the third light receiver 713 through the band-pass filter and extracts only a transmission signal on the control channel. The demodulation/carrier sense/decoding unit 723 demodulates the extracted transmission signal on the control channel, and receives a token signal and a transmission request packet (or only a token signal). Further, the demodulation/carrier sense/decoding unit 723 further judges whether or not there is a signal (a transmission request packet) succeeding the token signal transmitted on the control channel, and outputs the results of the judgment to the control unit 77.

The first encoding/modulation unit 741 encodes the transmission request packet generated by the control unit 77, and modulates a carrier signal fc (the control channel) by encoded digital data using a predetermined digital modulation system such as QAM. The second encoding/modulation unit 742 encodes the information packet generated by the control unit 77, and modulates a carrier signal fd (the data channel) by encoded digital data by using a predetermined digital modulation method such as QAM. The multiplexing unit 75 multiplexes the signals outputted from the first and second encoding/modulation units 741 and 742, and outputs a signal obtained by the multiplexing to the light emitter 76. When the signal is inputted only from one of the encoding/modulation units, the multiplexing unit 75 outputs only the inputted signal to the light emitter 76. The light emitter 76 has an oscillation frequency ($\lambda$a to $\lambda$c and $\lambda$n) which differs for each station (15a to 15c, and 15n), and generates a light signal on the basis of the electrical signal outputted from the multiplexing unit 75, and outputs the light signal to the optical coupling device 13.

The control unit 77 controls the sending and receiving of an information packet as described later.

The control station 10 includes a light emitter emitting light having a wavelength ($\lambda$0), and digitally modulates the carrier signal fc by a token signal, then converts the modulated carrier signal fc into a light signal (having a wavelength of $\lambda$0), and sends out the light signal onto the control channel of the outbound bus transmission line 11a. The control station 10 periodically performs such operations.

Description is now made of the sending and receiving of an information packet between the stations 15a and 15n. Operations performed by the stations at that time correspond to those described in the first embodiment and hence, the description of corresponding portions is simplified.

The control station 10 sends out a token which is a light signal onto the control channel of the outbound bus transmission line 11a in the above-mentioned manner. The station 15a shall have a request to transmit an information packet to the station 15n at the time point where the light signal (the token) is sent out from the control station 10.

An optical branching device 14a causes the light signal (having a wavelength of $\lambda$0) transmitted on the outbound bus transmission line 11a to branch into two light signals, and respectively outputs one of the light signals and the other light signal to the station 15a and the subsequent station. The third light receiver 713 in the station 15a collectively converts inputted light signals into electrical signals, and outputs the electrical signals to the demodulation/carrier sense/decoding unit 723. The demodulation/carrier sense/decoding unit 723 extracts only the electrical signal (in a band Bc) on the control channel out of the inputted electrical signals by the band-pass filter in its inside, demodulates the extracted electrical signal by a digital demodulator applied in QAM, PSK or the like and decodes the demodulated electrical signal. Consequently, the demodulation/carrier sense/decoding unit 723 receives a token. Further, the demodulation/carrier sense/decoding unit 723 judges whether or not a transmission request packet is sent out onto the control channel by the same method as that in the carrier sense/token detection unit 27 described in the first embodiment. That is, the demodulation/carrier sense/decoding unit 723 detects whether or not the electrical signal in the band Bd (the transmission request packet) is received during a gap of time $\delta$ after the receiving of the token.

The control unit 77 outputs the transmission request packet based on the above-mentioned transmission request to the first encoding/modulation unit 741 at the time point where the gap of time $\delta$ is confirmed by the demodulation/carrier sense/decoding unit 723 using the same method as the control unit 31 described in the first embodiment. The first encoding/modulation unit 741 encodes the transmission request packet, digitally modulates the carrier signal fd by the encoded transmission request packet, and outputs the modulated carrier signal fd to the multiplexing unit 75. The contents of the transmission request packet are the same as those shown in FIG. 3. The transmission request packet is outputted to the light emitter 76 through the multiplexing unit 75, and is converted into a light signal (having a wavelength of $\lambda$a) by the light emitter 76. The signal shall be inputted to the multiplexing unit 75 only from the first encoding/modulation unit 741. The transmission request packet (having a wavelength of $\lambda$a) obtained by converting the light signal is coupled to the other light signal (having a wavelength of $\lambda$0) obtained upon branching by the optical branching device 14a in such a manner that it succeeds the other light signal by an optical coupling device 13a. The optical coupling device 13a outputs a light signal obtained by the coupling in the above-mentioned manner toward the subsequent station. Thereafter, the stations 15b to 15n subsequent to the station 15a perform the same operations as the foregoing when there is a transmission request, while receiving the token but not performing responding operations when there is no transmission request at the time point where the token is received.

The light signal outputted to the outbound bus transmission line 11a in the above-mentioned manner is transmitted to the inbound bus transmission line 11b through a bus transmission line for connection 11c. The light signal is successively inputted to all the stations 15 through the optical branching devices 12 positioned halfway on the inbound bus transmission line 11b. Operations performed by the stations with respect to the light signals inputted through the respective optical branching devices 12 will be described later.

The control station 10 sends out a new token (a light signal having a wavelength of λ0) onto the control channel of the outbound bus transmission line 11a after a predetermined time. In the station 15a, the demodulation/carrier sense/decoding unit 723 receives a token by the same procedure as the foregoing. The control unit 77 outputs an information packet to be transmitted to the station 15n to the second encoding/modulation unit 742 after waiting for only time Tf since the token was received by the demodulation/carrier sense/decoding unit 723. The time Tf is time required to tune the wavelength of the variable wavelength filter 710 in each of the stations 15. The second encoding/modulation unit 742 encodes the information packet, further digitally modulates the carrier signal fd by encoded digital data, and outputs the digitally modulated carrier signal fd to the multiplexing unit 75.

The digitally modulated carrier signal fd is outputted to the light emitter 76 through the multiplexing unit 75, and is converted into a light signal having a wavelength of λa by the light emitter 76. In this case, only input from the second encoding/modulation unit 742 shall be provided to the multiplexing unit 75. The light signal is sent out onto the data channel of the outbound bus transmission line 11a through the optical coupling device 13a, and is transmitted toward the inbound bus transmission line 11b.

Description is now made of the procedure for receiving an information packet in each of the stations 15. The above-mentioned light signal is successively inputted to all the stations 15 through the optical branching devices 12 positioned halfway on the inbound bus transmission line 11b. The optical branching device 12n causes the light signal transmitted on the inbound bus transmission line 11b to branch into two light signals, and respectively outputs one of the light signals and the other light signal to the station 15n and the subsequent station.

The light signals inputted to the station 15n are collectively converted into electrical signals by the first light receiver 711, and are outputted to the first demodulation/decoding unit 721. The demodulation/decoding unit 721 extracts only the electrical signal (in a band Bc) on the control channel by the band-pass filter in its inside, demodulates the extracted electrical signal by a digital demodulator using QAM or the like, further decodes the electrical signal, and outputs the electrical signal to the control buffer 731 as digital data. That is, the control buffer 731 stores a token and a transmission request packet.

The control unit 77 in the station 15n retrieves a destination field included in the transmission request packet stored in the control buffer 731, and detects whether or not there exists an identifier indicating the station 15n. The control unit 77 waits, when it judges that there is no transmission request packet addressed to the station 15n as a result of the detection, until the subsequent toke n is stored in the control buffer 731.

On the other hand, the control unit 77 detects, when it judges that there is a transmission request packet addressed to the station 15n, whether the number of transmission request packets storing an identifier indicating the station 15n is one or plural. The control unit 77 waits until the subsequent token and the like are stored in the control buffer 731 when it judges that the number of transmission request packets addressed to the station 15n is one. The control unit 77 in the station 15n refers to a table (not shown) previously prepared in response to the storage of the subsequent token in the control buffer 731, to tune the wavelength passband of the variable wavelength filter 710 with the wavelength λa assigned to the station 15a which is a source of the transmission request packet. On the table, identifiers indicating all the stations 15 connected to the bus network according to the present embodiment and the wavelengths of the light signals sent out by the respective stations are recorded in relation to each other. The light signal having a wavelength of λa is also caused to branch into two light signals by the optical branching device 12n, similarly to the other light signal, and the light signals are inputted to the first light receiver 711 through the variable wavelength filter 710. The second light receiver 712 converts the inputted light signals into electrical signals, and outputs the electrical signals to the second demodulation/decoding unit 722. The second demodulation/decoding unit 722 extracts only the electrical signal on the data channel which is superimposed on the band fd by a band-pass filter in its inside, demodulates and decodes the extracted electrical signal by a decoder using QAM or the like, and outputs digital data obtained by the demodulation and decoding to the data buffer 732. That is, the data buffer 732 stores an information packet. Consequently, the sending and receiving of the information packet from the station 15a to the station 15n are completed.

Although in the inbound bus transmission line 11b, the station 15 subsequent to the station 15n also performs the same processing as the foregoing, the wavelength passband of the variable wavelength filter 710 is not tuned, whereby the information packet sent out by the station 15a is not received.

Operations performed by the control unit 77 in the station 15n in a case where it judges that the number of transmission request packets addressed to the station 15n is plural are the same as those described in the first embodiment and hence, the description thereof is not repeated.

(Third Embodiment)

Figure 9:
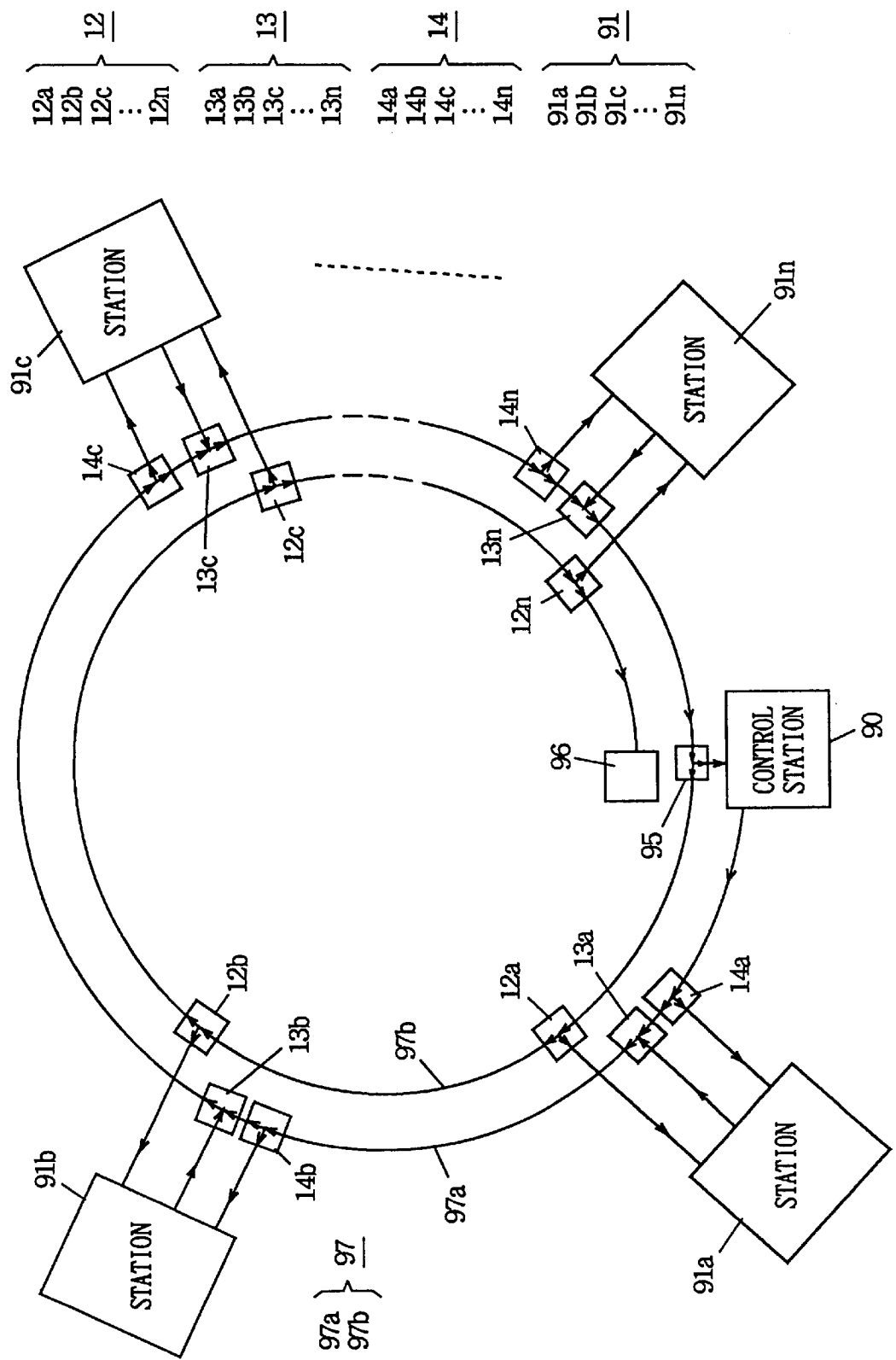
FIG. 9 is a block diagram showing the entire construction of a bus network according to a third embodiment of the present invention.

FIG. 9 is a block diagram showing the entire construction of a loop-shaped bus network according to a third embodiment of the present invention. In FIG. 9, in the bus network, a control station 90 for periodically sending out tokens using a control channel and a plurality of stations 91 (four stations 91a to 91c and 91n are illustrated), to and from which a token and a transmission request packet are inputted and outputted using the control channel, for transmitting and receiving an information packet using a data channel are connected to a circulating bus transmission line 97 constructed in a loop shape by an optical fiber. More specifically, the circulating bus transmission line 97 comprises an outbound bus transmission line 97a connected to the information output side of the station 91 and an inbound bus transmission line 97b connected to the information input side of the station 91. The outbound bus transmission line 97a and the inbound bus transmission line 97b are connected to each other by an optical branching device 95.

The optical branching device 95 causes a light signal inputted from the outbound bus transmission line 97a to branch into two light signals, and respectively outputs one of the light signals and the other light signal to the inbound bus transmission line 97b and the control station 90. An optical fiber terminating device 96 for terminating the light signal is connected to the other end of the inbound bus transmission line 97b. Each of the stations 91 is connected to the outbound bus transmission line 97a by an optical branching device 12 and an optical coupling device 13, and is connected to the inbound bus transmission line 97b by the optical branching device 12.

Figure 10:
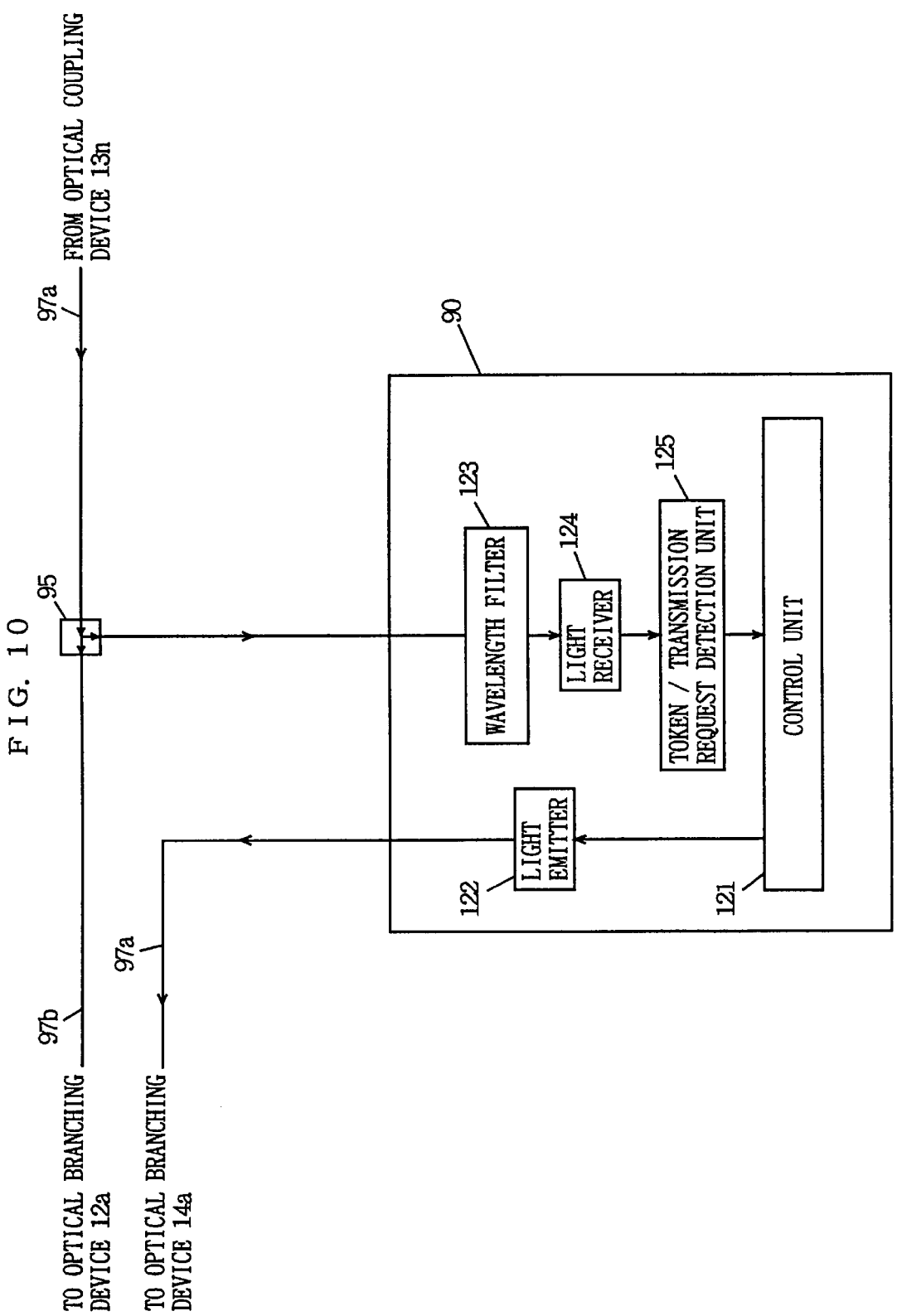
FIG. 10 is a block diagram showing the construction of a control station 90 shown in FIG. 9.

FIG. 10 is a block diagram showing the construction of the control station 90 shown in FIG. 9. In FIG. 10, the control station 90 comprises a control unit 121, a light emitter 122, a wavelength filter 123, a light receiver 124, and a token/transmission request detection unit 125.

Figure 11:
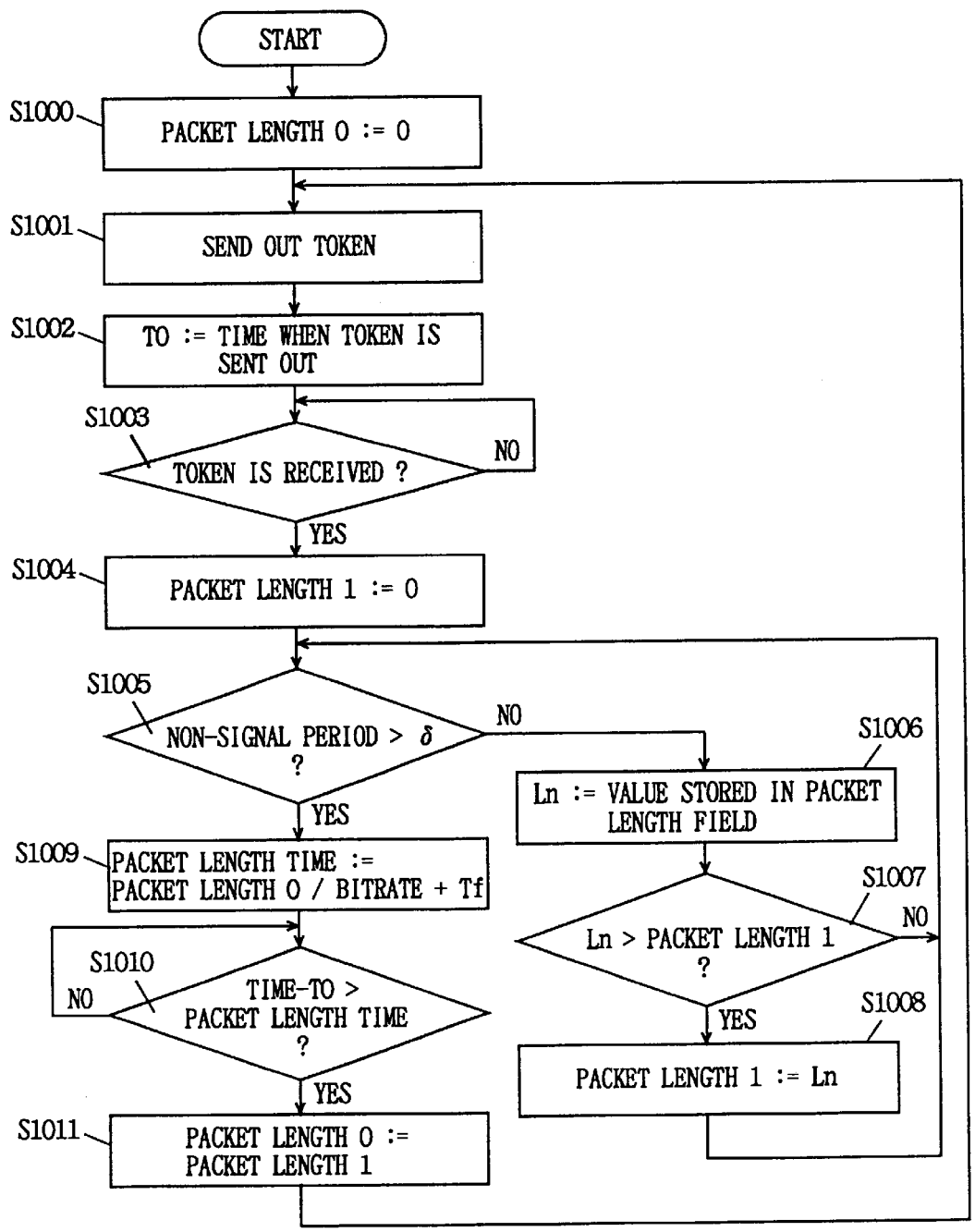
FIG. 11 is a flow chart showing the procedure for the control station 90 shown in FIG. 9 sending out a token.

The control unit 121 determines the timing of sending out a token in accordance with a flow chart of FIG. 11. The control station 90 comprises registers PL0 and PL1 storing "PacketLength0" and "PacketLength1" which are values used for detecting the maximum value of the packet length, a register T0 storing "T0" indicating the time when the token is sent out, a register Ln storing a value stored in a packet length field 337 included in a transmission request packet detected by the token/transmission request detection unit 125, and a register PLT storing time "PacketLengthTime" corresponding to the detected maximum packet length. The light emitter 122 converts the token into a light signal (having a wavelength of λc) and sends out the light signal.

The wavelength filter 123 passes only the light signal having a wavelength of λc. The light receiver 124 converts the light signal passing through the wavelength filter 123 into an electrical signal.

The token/transmission request detection unit 125 detects the token and the subsequent transmission request packet from each of the stations 91.

Figure 12:
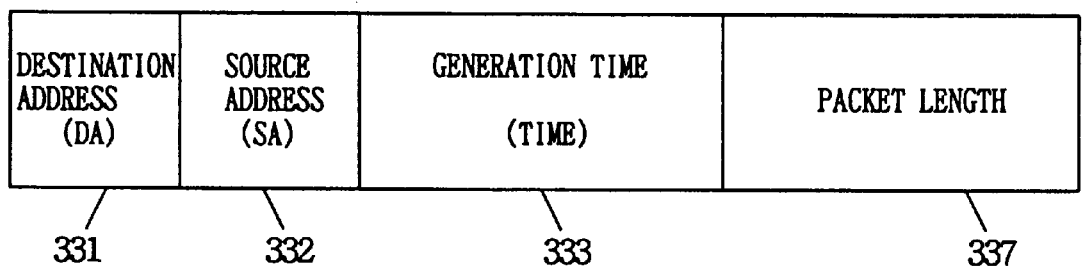
FIG. 12 is a diagram showing the format of a transmission request packet transmitted by each of terminals shown in FIG. 9.
Figure 13:
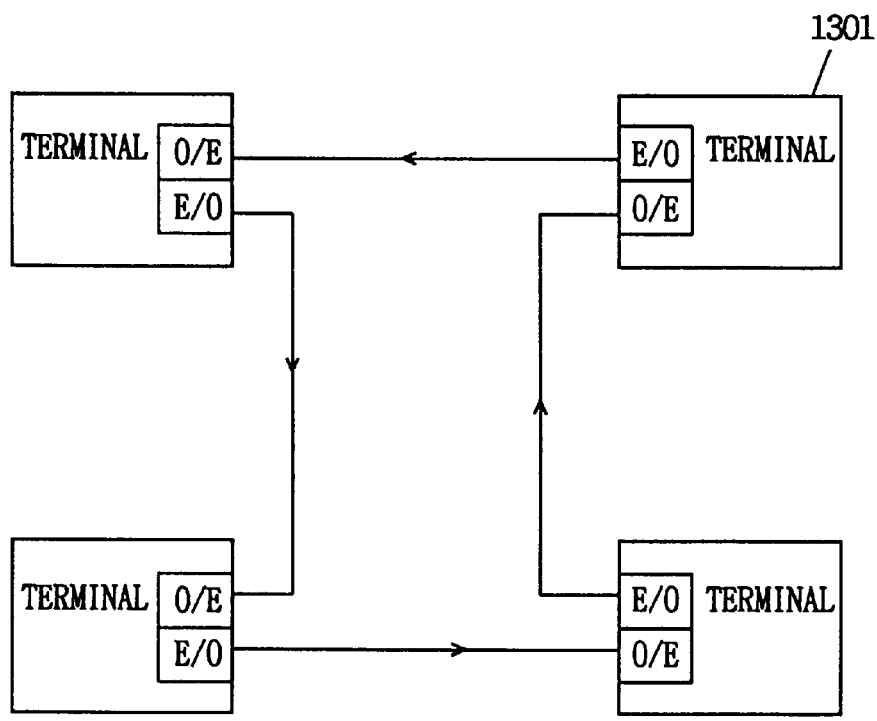
FIG. 13 is a block diagram showing the construction of an optical network according to "first background art"
Figure 14:
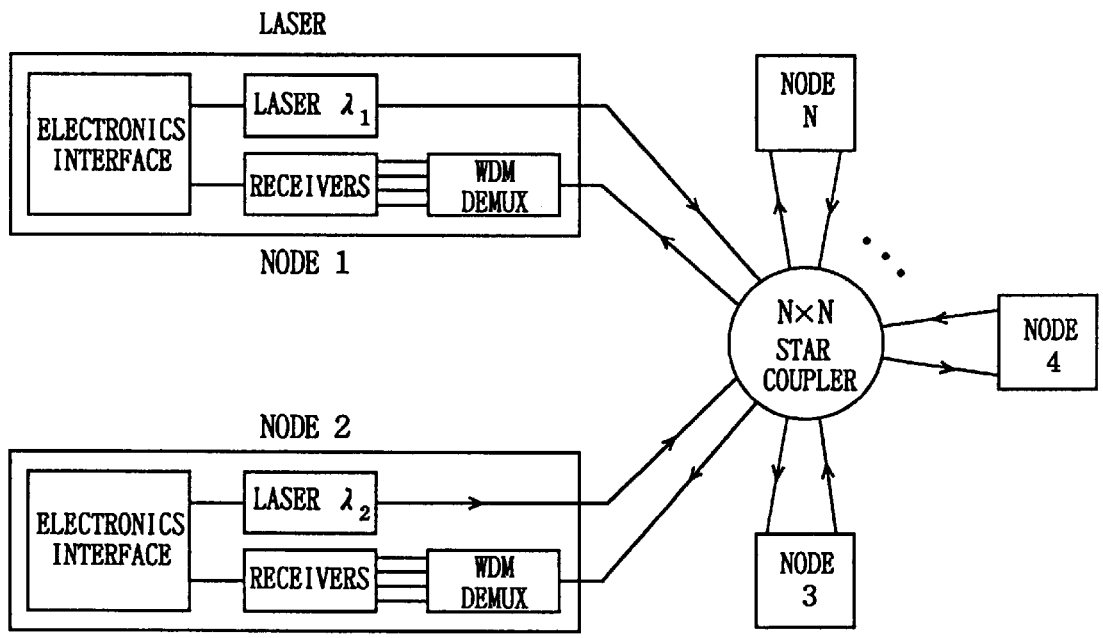
FIG. 14 is a block diagram showing the construction of an optical network according to "second background art"
Figure 15:
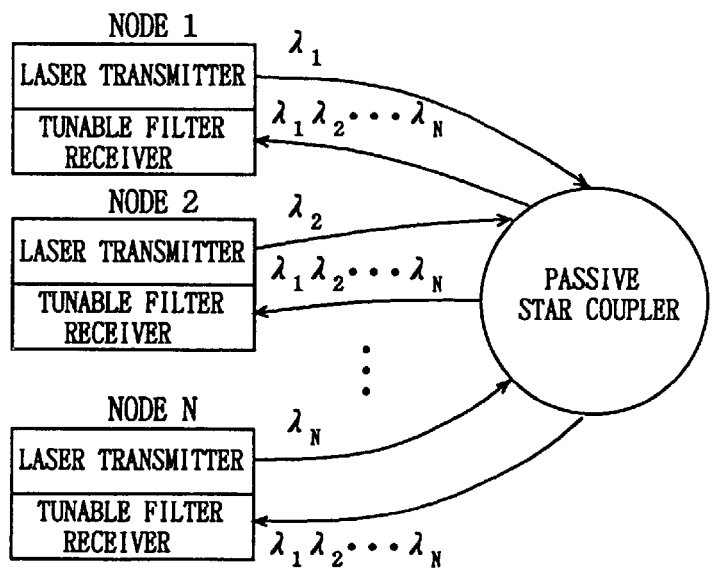
FIG. 15 is a block diagram showing the construction of an optical network according to "third background art"
Figure 16A:
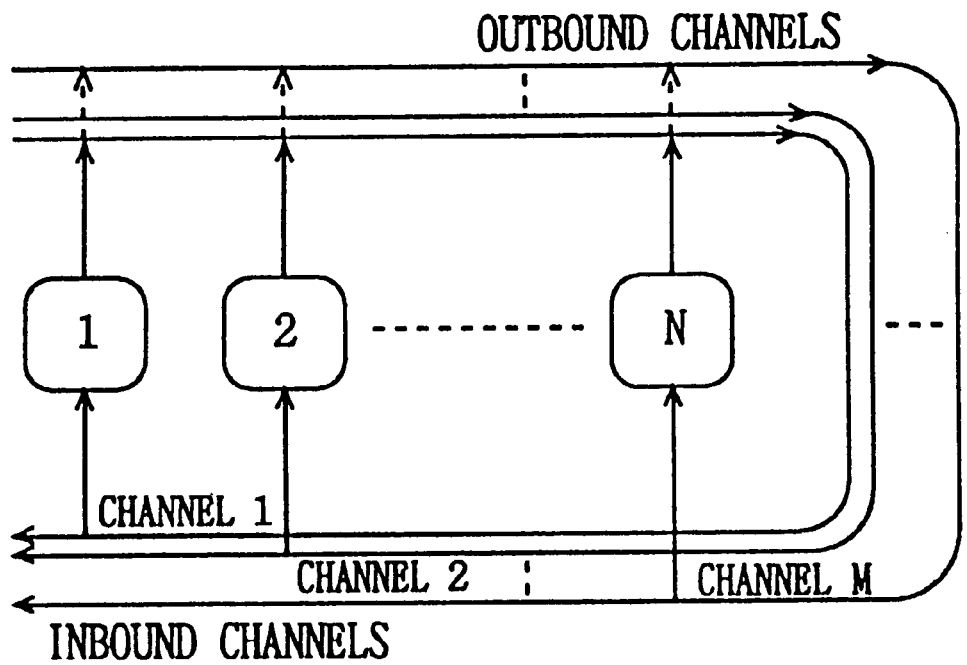
FIG. 16 is a block diagram showing the construction of an optical network according to "fourth background art"
Figure 16B:
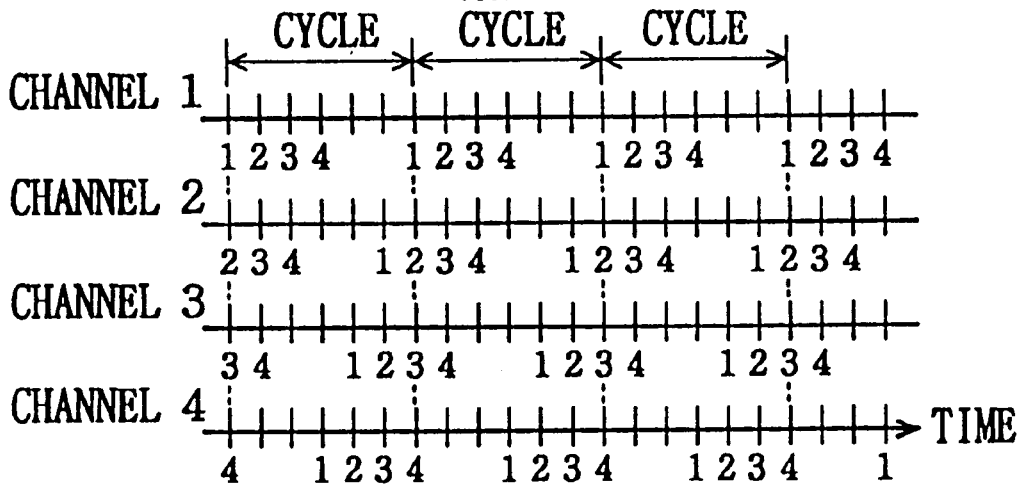
Figure 17:
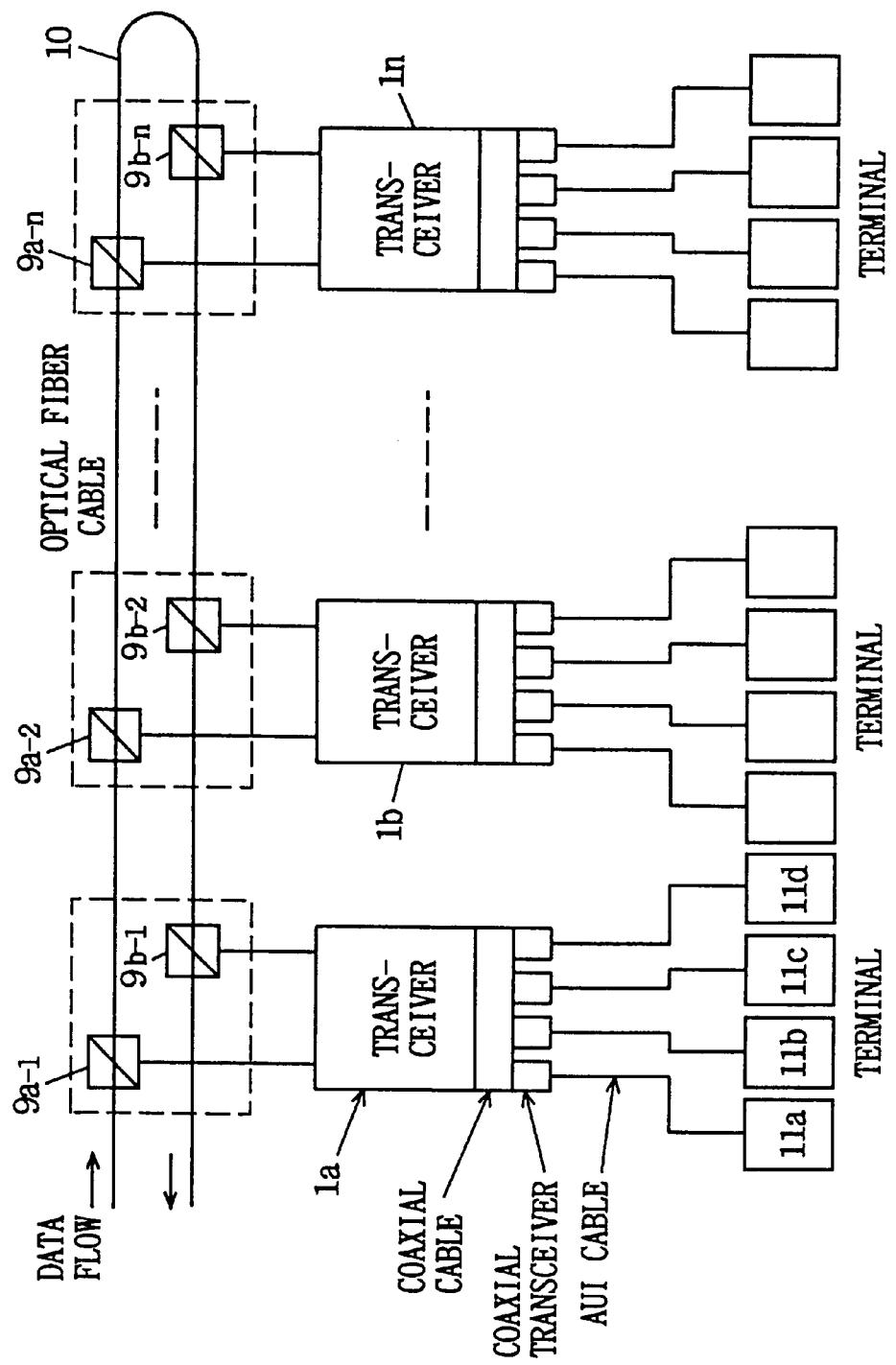
FIG. 17 is a block diagram showing the construction of an optical network according to "fifth background art".

The station 91 shown in FIG. 9 has the same function as that of the station 15 shown in FIG. 2 except that the format of a transmission request packet sent out by itself differs and hence, the detailed description of the station 91 is not repeated. FIG. 12 illustrates the format of the transmission request packet sent out by each of the stations 91. The transmission request packet shown in FIG. 12 is the same as the transmission request packet shown in FIG. 3 except that it further has a packet length field 337 storing the packet length of an information packet transmitted by the station 91. The other fields are the same as those shown in FIG. 3, and the corresponding fields are assigned the same reference numerals and hence, the description thereof is not repeated.

Referring now to FIGS. 9 to 12, description is made of token sending operations performed by the control station in the bus network according to the present embodiment.

First, the control unit 121 stores "0" as its initial value in the register PL0 (step S1000), then generates a token, and converts the token into a light signal using the light emitter 122. The control station 90 sends out the light signal obtained by converting the token onto the control channel of the outbound bus transmission line 97a (step S1001). The control unit 121 stores "T0" which is the time when the token (the light signal) is sent out in the register T0 (step S1002).

The token which is the light signal is transmitted on the outbound bus transmission line 97a, and is successively inputted to the station 91a to the station 91n. Each of the stations 91 detects the token in the same manner as that in the procedure in the first embodiment, and sends out the transmission request packet using the control channel if it has a transmission request. At this time, the packet length field 337 included in the transmission request packet stores the packet length of an information packet sent out by the station 91 in response to the subsequent token. Each of the stations 91 makes no response to the token if it has no transmission request.

The light signal transmitted on the outbound bus transmission line 97a will be inputted to the optical branching device 95. The optical branching device 95 causes the inputted light signal to branch into two light signals, and respectively outputs one of the light signals and the other light signal to the inbound bus transmission line 97b and the wavelength filter 123 in the control station 90. Only the light signal on the control channel out of the other light signals passes through the wavelength filter 123, is converted into an electrical signal by the light receiver 124, and is detected as a token by the token/transmission request detection unit 125.

The control unit 121 judges whether or not the token is received by the token/transmission request detection unit 125 (step S1003). The control unit 121 stores "0" as its initial value in the register PL1 when the token is received by the token/transmission request detection unit 125 (step S1004). The token/transmission request detection unit 125 detects a non-signal period subsequent to the token signal or the transmission request packet signal, and judges whether or not the non-signal period exceeds time δ (step S1005). The time δ is time for judging whether or not a transmission request packet from the previous station exists, similarly to the gap of time δ in the above-mentioned embodiments 1 and 2. That is, when the non-signal period is not more than the time δ, this means that the transmission request packet exists. At that time, the control unit 121 stores in the register Ln a value stored in the packet length field 337 included in the transmission request packet (step S1006).

The control unit 121 then compares the value "Ln" in the register Ln with "PacketLength1" which is a value stored in the register PL1 (step S1007). The control unit 121 updates the value in the register PL1 to the value in the register Ln when "Ln">"PacketLength1" (step S1008), and then proceeds to the step S1005. On the other hand, the control unit 121 proceeds to the step S1005 when "Ln"<"PacketLength1".

Furthermore, when it is judged in the step S1005 that the non-signal period is not less than the time δ, this means that the control unit 121 examines all transmission request packets subsequent to a token sent out by itself, and the value "PacketLength1" at this time is the maximum packet length of the information packet sent out by the station 91 in response to the token subsequently sent out. The control unit 121 previously stores in the register PLT time "PacketLengthTime" corresponding to the maximum packet length detected in the above-mentioned manner.

The control unit 121 then finds a value obtained by adding time Tf required to tune the wavelength of the wavelength filter in each of the stations 91 to "PacketLength0" meaning the maximum packet length stored in the transmission request packet transmitted in response to the token previously sent out divided by the bit rate of the transmission line as "PacketLengthTime" which is time required to transmit the packet, stores the value "PacketLengthTime" in the register PLT (step S1009), and then proceeds to the step S1010.

The control unit 121 examines whether or not a period "time-T0" from the time when the token is sent out "T0" which is stored in the register T0 to the present time "time"

is a larger value than the value "PacketLengthTime" stored in the register PLT (step S1010). The control unit 121 waits until "time-T0">"PacketLengthTime" when "time-T0" is not larger than "PacketLengthTime" in the step S1010, and then proceeds to the step S1011.

The control unit 121 then stores in the register PL0 the value "PacketLength1" currently stored in the register PL1 (step S1011), and proceeds to the step 1001 in which the token is sent out.

By the above-mentioned procedure, the control station 90 can always set the intervals between token signals at intervals which are always equal to time obtained by adding the maximum packet length out of the packet lengths reported by the transmission request packets from the stations 91 and time required to control the wavelength filter.

Since operations performed by the stations 91 with respect to a light signal obtained upon branching by the optical branching device 95 and outputted to the inbound bus transmission line 97b are the same as those performed by the stations 15 with respect to the light signal transmitted on the inbound bus transmission line 11b described in the first embodiment, the description thereof is not repeated. The light signal transmitted on the inbound bus transmission line 97b is finally inputted to the optical fiber terminating device 96. The optical fiber terminating device 96 terminates the inputted light signal.

As described in the foregoing, the control station 90 can control the intervals between token signals depending on the packet length reported by the transmission request signal from each of the terminals, whereby it is possible to improve the packet transmission efficiency.

In the above-mentioned third embodiment, the construction of the station 91 may be the same as the construction of the station shown in FIG. 8. Since operations performed by the control station 90 and each of the stations 91 at that time are the same as those described in the second embodiment and hence, the detailed description thereof is not repeated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bus network comprising:
    a control station and a plurality of stations connected to each other through a transmission line, said plurality of stations including a source station and a destination station, wherein said source station transmits transmission information to said destination station on the basis of tokens periodically sent out by said control station;
    said transmission line including
        an outbound transmission line connected to said source station for transmitting an information transmission request or a transmission information from said source station in response to a token inputted to said source station, and
        an inbound transmission line connected to said destination station for transmitting the information transmission request or the transmission information to said destination station;
    wherein
    said transmission line is assigned a control channel for the token and the information transmission request, and a data channel for the transmission information,
    said source station generates the information transmission request and sends out the information transmission request to said destination station via said outbound transmission line using said control channel after a first predetermined time since a first token was received by said source station,
    said source station sends out, after the information transmission request is generated, the transmission information to said destination station via said outbound transmission line using said data channel after a second predetermined time since a second token was received by said source station,
    said destination station inputs the first token from said control channel of said inbound transmission line, and detects the information transmission request from said source station which is inputted to said destination station after the first token, and
    said destination station inputs the second token from said control channel of said inbound transmission line, and inputs the transmission information from said source station, via the data channel, after the second predetermined time since the second token was inputted;
    wherein a node of said outbound transmission line and said inbound transmission line comprises branching means for causing a signal on the transmission line to branch into two signals and outputting one of the two signals to said control station;
    wherein said control station is for detecting, when the first token is inputted from said branching means, a maximum value of a packet length included in a transmission request packet subsequent to the first token; and
    wherein said control station is for setting sending intervals between the second token and the token sent out subsequently to the second token in response to the detected maximum value of the packet length.

2. The bus network according to claim 1, wherein
    said source station comprises detection means for detecting a non-signal period on the control channel in response to the receiving of the first token, and
    said source station judges that a station other than said source station has not sent out an information transmission request to said control channel and sends out the information transmission request of said source station to said control channel when said detection means detects the first predetermined time as the non-signal period.

3. The bus network according to claim 2, wherein
the information transmission request of said source station comprises a first identifier indicating the destination station, a second identifier indicating the source station, and the generation time when the information transmission request is generated.

4. The bus network according to claim 3, wherein
    said transmission line is composed of an optical fiber;
    said data channel is assigned a wavelength, and wavelengths assigned to said data channel in the plurality of stations are not overlapped with each other;
    said control channel is assigned a wavelength which is not overlapped with any one of the wavelengths assigned to said data channel in the plurality of stations;
    said control station converts said token into a light signal and sends out the light signal to the control channel;
    said source station comprises
        information transmission request output means for outputting an information transmission request depending on the results of the detection by said detection means, first light emission means for converting the information transmission request outputted from said information transmission request output means into a light signal and outputting the light signal to the control channel, transmission information output means for outputting transmission information in response to the second token, and second light emission means for converting the transmission information outputted from said transmission information output means into a light signal and outputting the light signal to a data channel inherent in the source station;

said destination station comprises variable wavelength selection means for selecting a light signal having the wavelength of the data channel assigned to said source station and passing the light signal having the wavelength; and said variable wavelength selection means is for selecting the wavelength assigned to the data channel inherent in the source station out of the wavelengths assigned to said data channel on the basis of an information transmission request received in response to the first token, and passing a light signal having the selected wavelength in response to the second token.

5. The bus network according to claim 4, wherein said variable wavelength selection means is for setting, when the first identifier included in the received information transmission request indicates the destination station, and the number of information transmission requests addressed to the destination station is one, the wavelength of the light signal to be passed on the basis of the second identifier.

6. The bus network according to claim 5, wherein said variable wavelength selection means is for setting, when the first identifier included in the received information transmission request indicates the destination station, and the number of information transmission requests addressed to the destination station is plural, the wavelength of the light signal to be passed on the basis of the second identifier and the generation time.

7. The bus network according to claim 3, wherein the transmission line is composed of an optical fiber;

said control station has a light emission means for emitting light having an inherent wavelength, and modulates a carrier having a first frequency assigned as the control channel by digital data which is a token signal, then converts the modulated carrier into a light signal, and sends out the light signal to the outbound transmission line;

said source station comprises first modulation means for modulating the carrier having the first frequency assigned as said control channel by digital data which is an information transmission request signal depending on the results of the detection by said detection means, second modulation means for modulating a carrier having a second frequency different from said first frequency and assigned as the data channel by digital data which is transmission information in response to the second token, and light emission means for converting a signal generated by said first modulation means and/or said second modulation means into a light signal having a wavelength which is not overlapped with any one of the wavelengths assigned to the other stations and said control station, and sending out the light signal to the outbound transmission line;

said destination station comprises variable wavelength selection means for selecting a light signal having the wavelength inherent in said source station and passing the light signal having the wavelength; and said variable wavelength selection means is for selecting the wavelength assigned to said source station on the basis of an information transmission request received in response to the first token inputted from said inbound transmission line, and passing a light signal having the selected wavelength on the basis of the second token inputted from said inbound transmission line.

8. The bus network according to claim 7, wherein said variable wavelength selection means is for setting, when the first identifier included in the received information transmission request indicates the destination station, and the number of information transmission requests addressed to the destination station is one, the wavelength of the light signal to be passed on the basis of the second identifier.

9. The bus network according to claim 8, wherein said variable wavelength selection means is for setting, when the first identifier included in the received information transmission request indicates the destination station, and the number of information transmission requests addressed to the destination station is plural, the wavelength of the light signal to be passed on the basis of the second identifier and the generation time.

10. A bus network comprising:

a control station and a plurality of stations connected to a loop-shaped bus through a transmission line, said plurality of stations including a source station and a destination station, wherein said source station transmits transmission information to said destination station on the basis of tokens periodically sent out by said control station;

said transmission line including an outbound transmission line connected to said source station for transmitting an information transmission request or a transmission information from said source station in response to a token inputted to said source station, and an inbound transmission line connected to said destination station for transmitting the information transmission request or the transmission information to said destination station;

wherein said transmission line is assigned a control channel for the token and the information transmission request, and a data channel for the transmission information, said source station generates the information transmission request and sends out the information transmission request to said destination station via said outbound transmission line using said control channel after a first predetermined time since a first token was received by said source station, said source station sends out, after the information transmission request is generated, the transmission information to said destination station via said outbound transmission line using said data channel in response to receiving the second token, said destination station inputs the first token from said control channel of said inbound transmission line, and detects the information transmission request from said source station in response to the first token, and said destination station inputs the second token from said control channel of said inbound transmission line, and receives the transmission information from said source station, via the data channel, in response to the second token;

wherein a node of said outbound transmission line and said inbound transmission line comprises branching means for causing a signal on the transmission line to branch into two signals and outputting one of the two signals to said control station;

wherein said control station is for detecting when the first token is inputted from said branching means, a maximum value of a packet length included in a transmission request packet subsequent to the first token; and wherein said control station is for setting sending intervals between the second token and the token sent out subsequently to the second token in response to the detected maximum value of the packet length.

11. The bus network according to claim 10, wherein said source station comprises detection means for detecting a non-signal period on the control channel in response to the receiving of said first token, and said source station judges that a station other than said source station has not sent out an information transmission request, and sends out the information transmission request of said source station to said control channel when said detection means detects the predetermined time as the non-signal period.

12. The bus network according to claim 11, wherein the information transmission request of said source station comprises a first identifier indicating the destination station, a second identifier indicating the source station, the generation time when the information transmission request is generated, and the packet length of the transmission information sent out in response to the receiving of the second token.

13. The bus network according to claim 12, wherein said transmission line is composed of an optical fiber;

said data channel is assigned a wavelength, and wavelengths assigned to said data channel in the plurality of stations are not overlapped with each other;

said control channel is assigned a wavelength which is not overlapped with any one of the wavelengths assigned to said data channel in the plurality of stations;

said control station converts said token into a light signal and sends out the light signal to the control channel;

said source station comprises information transmission request output means for outputting an information transmission request depending on the results of the detection by said detection means, first light emission means for converting the information transmission request outputted from said information transmission request output means into a light signal and outputting the light signal to the control channel, transmission information output means for outputting transmission information in response to the second token, and second light emission means for converting the transmission information outputted from said transmission information output means into a light signal and outputting the light signal to a data channel inherent in the source station; and said destination station comprises variable wavelength selection means for selecting a light signal having the wavelength assigned to the data channel in said source station and passing the light signal having the wavelength; and said variable wavelength selection means is for selecting the wavelength assigned to the data channel inherent in the source station out of the wavelengths assigned to said data channel on the basis of the information transmission request received in response to the first token, and passing a light signal having the selected wavelength in response to the second token.

14. The bus network according to claim 13, wherein said variable wavelength selection means is for setting, when the first identifier included in the received information transmission request indicates the destination station, and the number of information transmission requests addressed to the destination station is one, the wavelength of the light signal to be passed on the basis of the second identifier.

15. The bus network according to claim 14, wherein said variable wavelength selection means is for setting, when the first identifier included in the received information transmission request indicates the destination station, and the number of information transmission requests addressed to the destination station is plural, the wavelength of the light signal to be passed on the basis of the second identifier and the generation time.

16. The bus network according to claim 12, wherein said transmission line is composed of an optical fiber;

said control station has a light emission means for emitting light having an inherent wavelength, and modulates a carrier having a first frequency assigned as the control channel by digital data which is a token signal, then converts the modulated carrier into a light signal by the light emission means and sends out the light signal to the outbound transmission line;

said source station comprises first modulation means for modulating the carrier having the first frequency by digital data which is an information transmission request signal depending on the results of the detection by said detection means, second modulation means for modulating a carrier having a second frequency different from said first frequency and assigned as the data channel by digital data which is transmission information in response to the second token, and light emission means for converting a signal generated by said first modulation means and/or said second modulation means into a light signal having a wavelength which is not overlapped with any one of the wavelengths assigned to the other stations and said control station, and sending out the light signal to the outbound transmission line;

said destination station comprises variable wavelength selection means for selecting a light signal having the wavelength inherent in said source station and passing the light signal having the wavelength; and said variable wavelength selection means is for selecting the wavelength assigned to said source station on the basis of the information transmission request received in response to the first token inputted from said inbound transmission line, and passing a light signal having the selected wavelength on the basis of the second token inputted from said inbound transmission line.

17. The bus network according to claim 16, wherein said variable wavelength selection means is for setting, when the first identifier included in the received information transmission request indicates the destination station, and the number of information transmission requests addressed to the destination station is one, the wavelength of the light signal to be passed on the basis of the second identifier.

18. The bus network according to claim 17, wherein said variable wavelength selection means is for setting, when the first identifier included in the received information transmission request indicates the destination station, and the number of information transmission requests addressed to the destination station is plural, the wavelength of the light signal to be passed on the basis of the second identifier and the generation time.

* * * * *